US012536371B2

(12) United States Patent
Sharifi et al.

(10) Patent No.: US 12,536,371 B2
(45) Date of Patent: Jan. 27, 2026

(54) ON-DEVICE GRAMMAR CHECKING

(71) Applicant: Google LLC, Mountain View, CA (US)

(72) Inventors: Matthew Sharifi, Kilchberg (CH); Sebastian Millius, Zurich (CH); Qi Wang, Beijing (CN); Yunpeng Li, Zürich (CH); Shankar Kumar, New York, NY (US); Lukas Zilka, Kilchberg (CH); Simon Tong, Palo Alto, CA (US); Martin Sundermeyer, Zürich (CH)

(73) Assignee: Google LLC, Mountain View, CA (US)

( * ) Notice: Subject to any disclaimer, the term of this patent is extended or adjusted under 35 U.S.C. 154(b) by 232 days.

(21) Appl. No.: 18/246,326

(22) PCT Filed: Dec. 18, 2020

(86) PCT No.: PCT/US2020/065969
§ 371 (c)(1),
(2) Date: Mar. 22, 2023

(87) PCT Pub. No.: WO2022/132167
PCT Pub. Date: Jun. 23, 2022

(65) Prior Publication Data
US 2023/0359818 A1 Nov. 9, 2023

(51) Int. Cl.
G06F 40/253 (2020.01)
(52) U.S. Cl.
CPC .................. G06F 40/253 (2020.01)
(58) Field of Classification Search
CPC ......... G06F 40/253; G06N 3/045; G06N 3/08
See application file for complete search history.

(56) References Cited

U.S. PATENT DOCUMENTS 5,878,164 A * 3/1999 Brown ............... G06V 30/2268
382/190
8,775,341 B1 * 7/2014 Commons ........... G06F 16/3344
706/20

(Continued)

FOREIGN PATENT DOCUMENTS

CN        111062397 A     4/2020
JP       2020071608 A     5/2020

(Continued)

OTHER PUBLICATIONS

International Preliminary Report on Patentability from International Application No. PCT/US2020/065969 dated Jun. 29, 2023, 6 pp.

(Continued)

Primary Examiner — Michael Colucci
(74) Attorney, Agent, or Firm — Shumaker & Sieffert, P.A.

(57) ABSTRACT

A computing device may receive inputted text and perform, using one or more neural networks, on-device grammar checking of a sequence of words in the inputted text, including determining, using the one or more neural networks, a grammatically correct version of the sequence of words and determining that the sequence of words does not match the grammatically correct version of the sequence of words. The computing device may, in response to determining that the sequence of words does not match the grammatically correct version of the sequence of words, output, for display at a display device, at least a portion of the grammatically correct version of the sequence of words as a suggested replacement for at least a sequence of the sequence of words in the inputted text.

20 Claims, 4 Drawing Sheets

(56) References Cited

U.S. PATENT DOCUMENTS

| | | | |
|---|---|---|---|
| 11,056,098 B1* | 7/2021 | Gejji | G06F 7/57 |
| 2011/0313757 A1 | 12/2011 | Hoover et al. | |
| 2013/0085754 A1 | 4/2013 | Cohen et al. | |
| 2013/0246329 A1 | 9/2013 | Pasquero et al. | |
| 2014/0104175 A1 | 4/2014 | Ouyang et al. | |
| 2014/0316768 A1* | 10/2014 | Khandekar | G06F 16/3329 |
| | | | 704/9 |
| 2015/0104766 A1* | 4/2015 | Vuong | G06F 3/0481 |
| | | | 434/169 |
| 2016/0196257 A1 | 7/2016 | Choi | |
| 2017/0300472 A1 | 10/2017 | Parikh et al. | |
| 2019/0037040 A1* | 1/2019 | Kasaragod | H04L 67/562 |
| 2019/0385043 A1* | 12/2019 | Choudhary | G06F 13/4213 |
| 2020/0380963 A1* | 12/2020 | Chappidi | G06F 40/30 |
| 2021/0011961 A1* | 1/2021 | Guan | G06F 3/04842 |
| 2021/0397787 A1* | 12/2021 | Nagvenkar | G06N 3/04 |
| 2022/0067283 A1* | 3/2022 | Bellegarda | G06N 3/045 |

FOREIGN PATENT DOCUMENTS

| | | | |
|---|---|---|---|
| JP | 2020529666 A | 10/2020 | |
| WO | 2019024050 A1 | 2/2019 | |

OTHER PUBLICATIONS

Response to Communication Pursuant to Rules 161(1) and 162 EPC dated Jul. 25, 2023, from counterpart European Application No. 20845269.8, filed Jan. 23, 2024, 106 pp.

Ghosh et al., "Neural Networks for Text Correction and Completion in Keyboard Decoding", Journal of Latex Class Files, Aug. 2015, 14 pp.

International Search Report and Written Opinion of International Application No. PCT/US2020,065969, dated Sep. 10, 2021, 9 pp.

Honma et al., "Fast Japanese grammar error correction using non autoregressive model", Information Processing Society Technical Report Natural Language Processing (NL), Information Processing Society, Sep. 23, 2020, 9 pp., Translation not available.

Notification of Reason for Refusal, and translation thereof, from counterpart Japanese Application No. 2023-537087 dated Mar. 4, 2025, 8 pp.

Response to Office Action, and translation thereof, dated Mar. 4, 2025, from counterpart Japanese Application No. 2023-537087 filed May 30, 2025, 14 pp.

First Examination Report from counterpart Indian Application No. 202347030138 dated Oct. 15, 2025, 10 pp.

Notification of Reason for Refusal, and translation thereof, from counterpart Japanese Application No. 2023-537087 dated Aug. 27, 2025, 8 pp.

\* cited by examiner

ON-DEVICE GRAMMAR CHECKING

BACKGROUND

Applications running on a computing device may perform spell checking and grammar checking on documents edited using the applications. For example, a word processing application may include functionality for performing spell checking and grammar checking documents being edited in the application. Similarly, a computing device may provide system-wide spell checking functionality as text is entered at the computing device.

SUMMARY

In general, techniques of this disclosure are directed to performing on-device grammar checking of text entered at a computing device. Performing grammar checking of text entered at a computing device includes detecting grammatical errors in the text and correcting the detected grammatical errors in the text. An example computing device is described that is configured to perform grammar checking of sequences of words, such as sentences and/or sentence fragments, in the text inputted by a user at the computing device to detect grammatical errors in the sequences of words in the inputted text. The computing device may, in response to determining that a sequence of words in the text contains a grammatical error, provide a grammatically correct version of the sequence of words as a suggested replacement for the sequence of words.

For instance, after the user has typed the sentence (e.g., "Is we going to meet up later?"), the computing device may determine that the sentence is not grammatically correct (i.e., contains a grammatical error) and may provide a grammatically correct version of the sentence (e.g., "Are we going to meet up later?") as a suggested replacement to the grammatically incorrect sentence typed by the user. The user may interact with the computing device to either accept the suggested replacement or to reject the suggested replacement. If the user accepts the suggested replacement, the computing device may replace the sequence of words determined to contain a grammatical error with the grammatically correct version of the sentence in the text entered by the user.

The computing device may perform on-device grammar checking of text inputted by the user. That is, the computing device may perform grammar checking of text inputted by the user without sending the inputted text to an external computing system (e.g., to the cloud). Instead, the computing device may use one or more neural networks trained to perform grammar checking to perform on-device grammar checking on the text inputted by the user. The one or more neural networks may be trained off-device to perform grammar checking in ways that use fewer computing resources (e.g., using fewer processing cycles and less memory) compared with neural networks that perform server-side grammar checking, so that the computing device may be able to use one or more neural networks to perform grammar checking. As the computing device uses the one or more neural networks to perform grammar checking, the computing device may update the one or more neural networks to improve the grammar checking performance of the one or more neural networks.

By using one or more neural networks to perform on-device grammar checking, the computing device may be able to provide accurate grammar checking functionality without having to send and receive data to an external computing system that performs server-side grammar checking. Instead, the text inputted by the user may be kept on the computing device, thereby preserving the privacy of the user. In addition, performing on-device grammar checking may improve performance of the computing device, as further described below.

Throughout the disclosure, examples are described wherein a computing device and/or computing system may analyze information (e.g., e-mail, other communications, and the like) associated with the computing device and/or the user of the computing device only if the computing device and/or the computing system receives explicit permission from the user of the computing device to analyze the information. For example, in situations discussed herein in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, or a user's preferences), or to dictate whether and/or how the computing device and/or computing system may receive content that may be relevant to the user. In addition, certain data may be treated in one or more ways before it is stored or used by the computing device and/or computing system, so that personally-identifiable information is removed. Thus, the user may have control over how information is collected about the user and used by the computing device and/or computing system.

In one example, a method includes: receiving, by a computing device, inputted text; performing, by the computing device using one or more neural networks, on-device grammar checking of a sequence of words in the inputted text, including: determining, by the computing device and using the one or more neural networks, a grammatically correct version of the sequence of words, and determining, by the computing device, that the sequence of words does not match the grammatically correct version of the sequence of words; in response to determining that the sequence of words does not match the grammatically correct version of the sequence of words, outputting, by the computing device and for display at a display device, at least a portion of the grammatically correct version of the sequence of words as a suggested replacement for at least a portion of the sequence of words in the inputted text.

In another example, a computing device includes a memory. The computing device further includes one or more processors configured to: receive inputted text; perform, using one or more neural networks executing at the one or more processors, on-device grammar checking of a sequence of words in the inputted text, including: determining, using the one or more neural networks, a grammatically correct version of the sequence of words, and determining that the sequence of words does not match the grammatically correct version of the sequence of words; and in response to determining that the sequence of words does not match the grammatically correct version of the sequence of words, output, for display at a display device, at least a portion of the grammatically correct version of the sequence of words as a suggested replacement for at least a portion of the sequence of words in the inputted text.

In another example, a computer-readable storage medium is described that includes instructions, that when executed, cause at least one processor of a computing device to: receive inputted text; perform, using one or more neural networks, on-device grammar checking of a sequence of words in the inputted text, including: determining, using the one or more neural networks, a grammatically correct version of the sequence of words, and determining that the sequence of words does not match the grammatically correct version of the sequence of words; and in response to determining that the sequence of words does not match the grammatically correct version of the sequence of words, output, for display at a display device, at least a portion of the grammatically correct version of the sequence of words as a suggested replacement for at least a portion of the sequence of words in the inputted text.

In another example, a computing device is described that includes means for receiving inputted text; means for performing, using one or more neural networks, on-device grammar checking of a sequence of words in the inputted text, including: means for determining, using the one or more neural networks, a grammatically correct version of the sequence of words, and means for determining that the sequence of words does not match the grammatically correct version of the sequence of words; means for, in response to determining that the sequence of words does not match the grammatically correct version of the sequence of words, outputting, for display at a display device, at least a portion of the grammatically correct version of the sequence of words as a suggested replacement for at least a portion of the sequence of words in the inputted text.

The details of one or more examples are set forth in the accompanying drawings and the description below. Other features, objects, and advantages of the disclosure will be apparent from the description and drawings, and from the claims.

DETAILED DESCRIPTION

Figure 1:
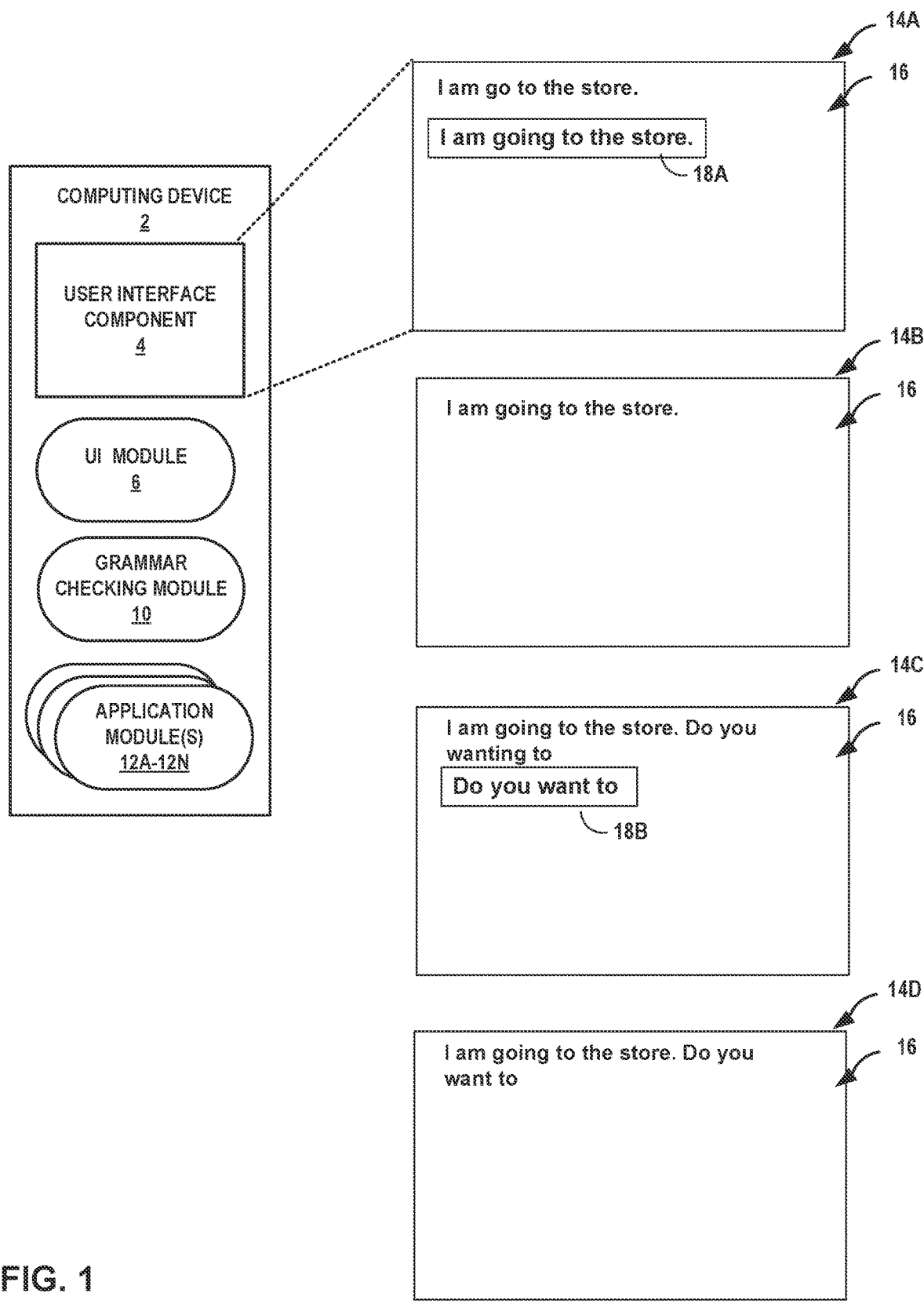
FIG. 1 is a conceptual diagram illustrating an example computing device that is configured to use a neural network to perform grammar checking of inputted text, in accordance with one or more aspects of the present disclosure.

FIG. 1 is a conceptual diagram illustrating an example computing device that is configured to use a neural network to perform grammar checking of inputted text, in accordance with one or more aspects of the present disclosure. In the example of FIG. 1, computing device 2 may include, but is not limited to, portable or mobile devices such as mobile phones (including smart phones), laptop computers, tablet computers, wearable computing devices such as smart watches or computerized eyewear, smart television platforms, cameras, personal digital assistants (PDAs), etc. In some examples, computing device 2 may include stationary computing devices such as desktop computers, servers, mainframes, etc.

As shown in FIG. 1, computing device 2 includes user interface component 4 ("UIC 4") user interface module 6 ("UI module 6"), grammar checking module 10, and application modules 12A-12N ("applications 12"). Modules 6, 10, and 12 may perform operations described herein using software, hardware, firmware, or a mixture of both hardware, software, and firmware residing in and executing on computing device 2 or at one or more other remote computing devices. In some examples, modules 6, 10, and 12 may be implemented as hardware, software, and/or a combination of hardware and software. Computing device 2 may execute modules 6, 10, and 12 with one or more processors. Computing device 2 may execute any of modules 6, 10, and 12 as or within a virtual machine executing on underlying hardware. Modules 6, 10, and 12 may be implemented in various ways. For example, any of modules 6, 10, and 12 may be implemented as a downloadable or pre-installed application or "app." In another example, any of modules 6, 10, and 12 may be implemented as part of an operating system of computing device 2. Other examples of computing device 2 that implement techniques of this disclosure may include additional components not shown in FIG. 1.

UIC 4 of computing device 2 may function as an input device for computing device 2 and as an output device. For instance, UIC 4 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UIC 4 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 2.

UIC 4 of computing device 2 may include a presence-sensitive screen that may receive tactile user input from a user of computing device 2. UIC 4 may receive the tactile user input by detecting one or more taps and/or gestures from a user of computing device 2 (e.g., the user touching or pointing to one or more locations of UIC 4 with a finger or a stylus pen). The presence-sensitive screen of UIC 4 may present output to a user. UIC 4 may present the output as a user interface, which may be related to functionality provided by computing device 2. For example, UIC 4 may present various functions and applications executing on computing device 2 such as an electronic message application, a messaging application, a map application, etc.

Application modules 12 may include functionality to perform any variety of operations on computing device 2. For instance, application modules 12 may include an email application, text messaging application, instant messaging application, weather application, video conferencing application, social networking application, weather application, stock market application, emergency alert application, sports application, office productivity application, multimedia player, etc. Although shown as operable by computing device 2, one or more of application modules 12 may be operable by a remote computing device that is communicatively coupled to computing device 2. In such examples, an application module executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from computing device 2. For instance, the remote computing device may be operatively coupled to computing device 2 by a network. Examples of a remote computing device may include, but is not limited to a server, smartphone, tablet computing device, smart watch, and desktop computer. In some examples, a remote computing device may not be an integrated component of computing device 2.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2. In some instances, portions of the functionality of UI module 6 or any other module described in this disclosure may be implemented across any combination of an application, hardware unit, and operating system.

UI module 6 may interpret inputs detected at UIC 4 (e.g., as a user provides one or more gestures at a location of UIC 4 at which user interface 14A or another example user interface is displayed). UI module 6 may relay information about the inputs detected at UIC 4 to one or more associated platforms, operating systems, applications, and/or services executing at computing device 2 to cause computing device 2 to perform a function. UI module 6 may also receive information and instructions from one or more associated platforms, operating systems, applications, and/or services executing at computing device 2 (e.g., applications 12) for generating a GUI. In addition, UI module 6 may act as an intermediary between the one or more associated platforms, operating systems, applications, and/or services executing at computing device 2 and various output devices of computing device 2 (e.g., speakers, LED indicators, vibrators, etc.) to produce output (e.g., graphical, audible, tactile, etc.) with computing device 2.

In the example of FIG. 1, one of applications 12 may send data to UI module 6 that causes UIC 4 to generate user interfaces 14A-14D ("user interfaces 14") and elements thereof. In response, UI module 6 may output instructions and information to UIC 4 that cause UIC 4 to display a user interface of user interfaces 14 according to the information received from the application. When handling input detected by UIC 4, UT module 6 may receive information from UIC 4 in response to inputs detected at locations of a screen of UIC 4 at which elements of user interface 14 are displayed. UI module 6 disseminates information about inputs detected by UIC 4 to other components of computing device 2 for interpreting the inputs and for causing computing device 2 to perform one or more functions in response to the inputs.

User interfaces 14 represent graphical user interfaces with which a user of computing device 2 can interact with applications 12 of computing device 2, such as a messaging client (e.g., a text messaging client or an e-mail client), a web browser application, a word processing application, and the like, to input text. For example, user interfaces 14 may represent an editing interface via which a user may input text at UIC 4 to edit (e.g., compose, reply to, or forward) electronic messages, edit electronic documents, enter text into text fields, or otherwise enter text for applications 12.

As the user enters text, grammar checking module 10 may perform grammar checking on the text entered by the user. That is, grammar checking module 10 may determine whether the text entered by the user contains grammatical errors and, if so, may enable the user to correct such grammatical errors.

In some examples, grammar checking module 10 may be part of an input method editor (IME), such as a graphical keyboard IME, that executes at computing device 2 to provide system-wide user controls that enable users of computing device 2 to enter text at computing device 2. For example, the IME may receive data from UI module 20 that represents the sequence of touch events generated by UI module 20 and may also receive data from UI module 20 that represents locations of UIC 4 where UIC 4 presents each of the keys of a graphical keyboard. The IME may determine, based on the locations of the keys, that the sequence of touch events represents a selection of one or more keys to determine the text inputted at computing device 2 via the IME.

Because different applications executing at computing device 2 may invoke an IME in order to receive text inputted by a user, grammar checking module 10 may, by being a part of the IME, be able to provide grammar checking functionality to any application that invokes the IME that includes grammar checking module 10. In this way, grammar checking module 10 may provide system-wide grammar checking functionality for computing device 2 that is not limited to certain applications executing at computing device 2.

In general, grammar checking module 10 may perform grammar checking on any sequence of words inputted by the user. For example, grammar checking module 10 may, in response to detecting that the user has finished inputting a sentence, such as by determining that the user has inputted an end mark (e.g., a period, a question mark, or an exclamation mark), detecting a long pause in text input by the user, or by determining that the user has selected a different text input field, perform grammar checking on the sentence that the user just finished inputting. Grammar checking module 10 may perform grammar checking on sentence fragments or any other sequence of words inputted by the user. For example, grammar checking module 10 may perform grammar checking of text inputted by the user after every word inputted by the user, after every N words inputted by the user, or upon detecting a long pause in text input by the user.

Grammar checking module 10 may perform grammar checking of a sequence of words inputted by the user by generating, based on the sequence of words inputted by the user, a grammatically correct version of the sequence of words inputted by the user. Grammar checking module 10 may compare the sequence of words inputted by the user with the grammatically correct version of the sequence of words to determine if the sequence of words inputted by the user matches (e.g., is the same as) the grammatically correct version of the sequence of words. If grammar checking module 10 determines that the sequence of words inputted by the user does not match the grammatically correct version of the sequence of words, the grammar checking module 10 may determine that the sequence of words inputted by the user is not grammatically correct and may output the grammatically correct version of the sequence of words as a suggested replacement for the sequence of words inputted by the user.

In accordance with techniques of the disclosure, grammar checking module 10 may use one or more neural networks installed at computing device 2 to perform on-device grammar checking on the text entered by the user. In general one or more neural networks implemented by grammar checking module 10 may include multiple interconnected nodes, and each node may apply one or more functions to a set of input values that correspond to one or more features, and provide one or more corresponding output values. A feature may be a sequence of words inputted by the user to be grammar checked by grammar checking module 10, and the one or more corresponding output values of one or more neural networks may be a sequence of words that corresponds to the sequence of words inputted by the user to be grammar checked.

The one or more corresponding output values may, in some examples, include probabilities of sequences of words. Accordingly, grammar checking module 10 may use one or more neural networks to determine probabilities of sequences of words based on the features of the user input, and may determine and output the sequence of words having the highest probability of being a grammatically correct version of the sequence of words inputted by the user to be grammar checked by grammar checking module 10 based on the corresponding probabilities.

One or more neural networks may be trained on-device by grammar checking module 10 to more accurately determine the sequence of words having the highest probability of being a grammatically correct version of the sequence of words inputted by the user based on the features. For instance, one or more neural networks may include one or more learnable parameters or "weights" that are applied to the features. Grammar checking module 10 may adjust these learnable parameters during the training to improve the accuracy with which one or more neural networks determines the sequence of words that is most likely to be a grammatically correct version of the sequence of words inputted by the user to be grammar checked by grammar checking module 10. For example, based on whether the user chooses to replace the sequence of words inputted by the user with the sequence of words outputted by one or more neural networks, grammar checking module 10 may adjust a learnable parameter.

Grammar checking module 10 may determine, based on the sequence of words outputted by one or more neural networks, a grammatically correct version of the sequence of words inputted by the user. For example, grammar checking module 10 may determine the sequence of words outputted by one or more neural networks to be a grammatically correct version of the sequence of words inputted by the user.

In some examples, grammar checking module 10 may, utilize heuristics or one or more other neural networks to perform post processing of the sequence of words outputted by one or more neural networks and may determine, based on the post processed sequence of words outputted by one or more neural networks, a grammatically correct version of the sequence of words inputted by the user. Grammar checking module 10 may perform such post processing to determine whether to modify the sequence of words outputted by one or more neural networks in order to determine a grammatically correct version of the sequence of words inputted by the user. Furthermore, grammar checking module 10 may perform such post processing to determine whether to output a grammatically correct version of the sequence of words inputted by the user as a suggested replacement for the sequence of words inputted by the user.

Grammar checking module 10 may perform post processing of the sequence of words outputted by one or more neural networks to match the gender of the pronouns in the sequence of words outputted by one or more neural networks with the gender of the pronouns in the sequence of words inputted by the user. For example, if the sequence of words inputted by the user includes feminine pronouns such as "she" and "her", grammar checking module 10 may replace masculine pronouns such as "he" and "him" in the sequence of words outputted by one or more neural networks with the corresponding feminine pronouns in order to match the gender of the pronouns in the sequence of words outputted by one or more neural networks with the gender of the pronouns in the sequence of words inputted by the user. Grammar checking module 10 may therefore determine the post processed sequence of words outputted by one or more neural networks to be a grammatically correct version of the sequence of words inputted by the user.

The sequence of words inputted by the user may include one or more emojis. As such, grammar checking module 10 may also perform post processing of the sequence of words outputted by one or more neural networks to ensure that the same emojis in the sequence of words inputted by the user are included at corresponding locations in the sequence of words outputted by the one or more neural networks. Grammar checking module 10 may therefore determine the post processed sequence of words outputted by one or more neural networks to be a grammatically correct version of the sequence of words inputted by the user.

In some examples, as part of post processing of the sequence of words outputted by one or more neural networks, grammar checking module 10 may also perform one or more sanity checks on the sequence of words outputted by one or more neural networks. If grammar checking module 10 determines that the sequence of words outputted by one or more neural networks does not pass the one or more sanity checks, grammar checking module 10 may refrain from outputting a grammatically correct version of the sequence of words inputted by the user as a suggested replacement for the sequence of words inputted by the user. In general, grammar checking module 10 performs one or more sanity checks to ensure that the sequence of words outputted by one or more neural networks make sense as an intelligible sequence of words. For example, grammar checking module 10 may determine whether the sequence of words outputted by one or more neural networks includes a subject and a verb. In some examples, grammar checking module 10 may determine that the length of the sequence of words outputted by one or more neural networks is different from the sequence of words inputted by the user. In some examples, grammar checking module 10 may determine whether the edit distance between the sequence of words outputted by one or more neural networks and the sequence of words inputted by the user is below a threshold edit distance value.

In some examples, grammar checking module 10 may perform post processing of the sequence of words outputted by one or more neural networks to determine whether the sequence of words include a sensitive topic or a sensitive subject matter. Some examples of a sensitive topic or a sensitive matter may include, but are not limited to, deaths, funerals, crimes, job losses, job rejections, academic rejections, and the like. If grammar checking module 10 determines that the sequence of words include a sensitive topic or a sensitive subject matter, grammar checking module 10 may refrain from outputting a grammatically correct version of the sequence of words inputted by the user as a suggested replacement for the sequence of words inputted by the user. In some examples, grammar checking module 10 may, prior to performing on-device grammar checking of the sequence of words inputted by the user, determine whether the sequence of words inputted by the user includes a sensitive topic or a sensitive subject matter. If grammar checking module 10 determines that that the sequence of words inputted by the user includes a sensitive topic or a sensitive subject matter, grammar checking module 10 may refrain from performing grammar checking of the sequence of words inputted by the user.

If grammar checking module 10 determines not to refrain from outputting a grammatically correct version of the sequence of words inputted by the user as a suggested replacement for the sequence of words inputted by the user, grammar checking module 10 may determine whether the sequence of words inputted by the user matches grammatically correct version of the sequence of words. If grammar checking module 10 determines the sequence of words inputted by the user matches the grammatically correct version of the sequence of words inputted by the user, grammar checking module 10 may determine that the sequence of words inputted by the user is grammatically correct, and may refrain from outputting a grammatically correct version of the sequence of words.

If grammar checking module 10 determines the sequence of words inputted by the user does not match the grammatically correct version of the sequence of words inputted by the user, grammar checking module 10 may output the grammatically correct version of the sequence of words inputted by the user as a suggested replacement for the sequence of words inputted by the user. If the user selects the suggested replacement for the sequence of words inputted by the user, grammar checking module 10 may replace, in text being edited by the user, the sequence of words inputted by the user with the grammatically correct version of the sequence of words inputted by the user. In this way, computing device 2 may use grammar checking module 10 to perform grammar checking of text being edited by the user.

For example purposes, the techniques for using one or more neural networks to perform grammar checking on text inputted by the user are further described in detail with reference to FIG. 1. In the example of FIG. 1, UI module 6 may output instructions and information to UIC 4 that cause UIC 4 to display user interfaces 14. User interface 14A outputted by UIC 4 includes text field 16 in which the user may input text, such as the sentence "I am go to the store." Grammar checking module 10 may determine that the period at the end of the sequence of words "I am go to the store" denotes the end of a sentence and may, in response, perform grammar checking on the sentence "I am go to the store."

Grammar checking module 10 may determine that a grammatically correct version of the sentence "I am go to the store" is "I am going to the store" and may determine that the sentence of "I am go to the store" being grammar checked does not match the grammatically correct sentence "I am going to the store." Grammar checking module 10 may therefore output, in user interface 14A, the grammatically correct sentence "I am going to the store" as suggested replacement 18A for the sentence "I am go to the store" being grammar checked by grammar checking module 10. In some examples, instead of outputting suggested replacement 18A for the sentence, grammar checking module 10 may output a specific delta, such as "going", which may be a suggested replacement for the word in the sentence, such as the word "go", that makes the sentence grammatically incorrect, and may highlight the word "go" to be replaced with specific delta of "going".

If the user would like to accept the replacement of the sentence "I am go to the store" with the suggested replacement 18A of "I am going to the store," the user may provide user input that corresponds to accepting suggested replacement 18A, such as by providing touch input at the location of UIC 4 that corresponds to the location of suggested replacement 18A. As shown in user interface 14B outputted by UIC 4, in response to UIC 4 receiving user input that corresponds to accepting suggested replacement 18A, computing device 2 may replace the sentence "I am go to the store" entered by the user in text field 16 with "I am going to the store."

The user may continue to edit text at computing device 2 by inputting additional sequences of words in text field 16. As shown in user interface 14C outputted by UIC 4, the user may subsequently input the sentence fragment "Do you wanting to" into text field 16. As described above, grammar checking module 10 may perform grammar checking not only on complete sentences but may also perform grammar checking on sentence fragments or any other sequence of words. As such, grammar checking module 10 may, in response to the user inputting the sentence fragment "Do you wanting to" into text field 16, perform grammar checking on the sentence fragment "Do you wanting to."

Grammar checking module 10 may determine that a grammatically correct version of the sentence fragment "Do you wanting to" is "Do you want to" and may determine that the sentence fragment of "Do you wanting to" being grammar checked does not match the grammatically correct sentence fragment "Do you want to." Grammar checking module 10 may therefore output, in user interface 14C, the grammatically correct sentence fragment "Do you want to" as suggested replacement 18B for the sentence fragment "Do you wanting to" being grammar checked by grammar checking module 10.

If the user would like to accept the replacement of the sentence fragment "Do you wanting to with the suggested replacement 18B of "Do you want to," the user may provide user input that corresponds to accepting suggested replacement 18B, such as by providing touch input at the location of UIC 4 that corresponds to the location of suggested replacement 18B. As shown in user interface 14D outputted by UIC 4, in response to UIC 4 receiving user input that corresponds to accepting suggested replacement 18B, computing device 2 may replace the sentence fragment "Do you wanting to" entered by the user in text field 16 with "Do you want to."

In this way, the techniques of the disclosure may use one or more neural networks to perform on-device grammar checking of text inputted at computing device 2. By performing grammar checking, computing device 2 may promote more efficient user interactions with computing device 2, thereby causing the computing device 2 to receive fewer inputs to correct grammatical mistakes made by the user compared with computing devices that do not perform grammar checking. Computing device 2 may therefore perform fewer operations (or, in other words, utilize fewer processor cycles) and may consume less electrical power and/or result in battery power savings, as compared to other computing devices. In addition, computing device 2 may provide a less frustrating and more seamless and/or frictionless user experience.

Further, by performing on-device grammar checking, the techniques of this disclosure reduce the amount of data that is sent and received by computing device 2 over a network. Reducing the amount of data that is sent and received by computing device 2 over a network may reduce network congestion and network bandwidth utilization in the network and may also improve the battery life of computing device 2 by reducing computing device 2's use of radios and network transceivers to send and receive data over the network. The techniques of this disclosure may further enable computing device 2 to perform grammar checking under poor or intermittent network conditions, and even while computing device 2 is not connected to a network.

Further, by performing on-device grammar checking, the techniques of this disclosure also improve the responsiveness of the grammar checking functionality of the computing device. By not having to send text to a remote computing system for performing grammar checking, the techniques of this disclosure may reduce the latency in performing grammar checking, thereby leading to greater responsiveness of the computing device, thereby providing a greater user experience. In addition, by performing on-device grammar checking, the techniques of this disclosure improve the protection of the user's privacy by not sending text inputted by the user off of computing device 2.

While the techniques of this disclosure describe grammar checking module 10 and grammar checking in terms of performing grammar checking of sequences of words that are in the English language, the techniques of this disclosure may equally be applicable to perform grammar checking of any written language. For example, the techniques of this disclosure may equally be used to perform grammar checking of non-English written languages and writing systems, such as French, German, Russian, and the like. Furthermore, the techniques of this disclosure may also equally be used to perform grammar checking of written languages and writing systems, such Chinese, Japanese, and Korean, that use logograms or logographs to represent words and morphemes.

Figure 2:
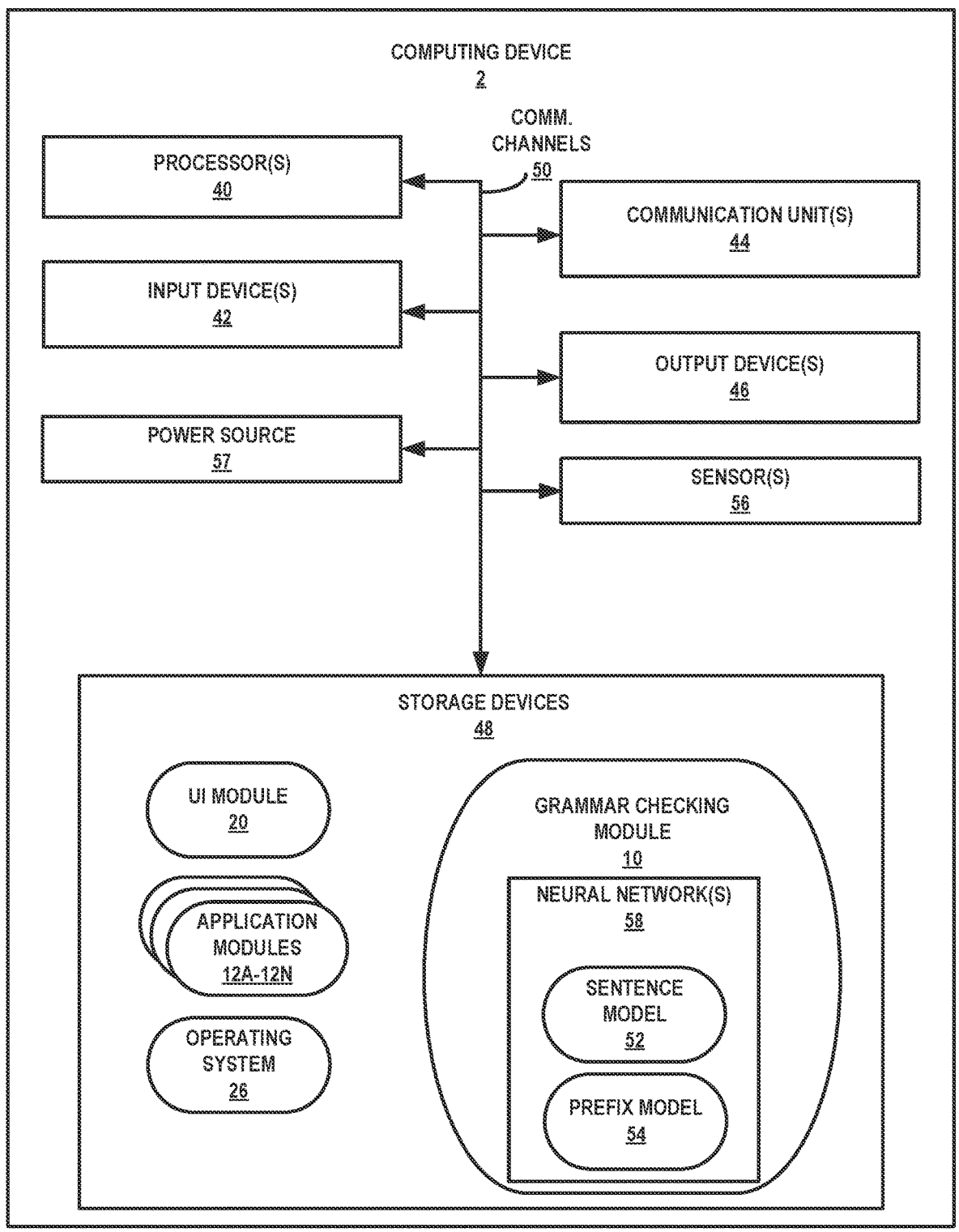
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 2, and many other examples of computing device 2 may be used in other instances and may include a subset of the components included in example computing device 120 or may include additional components not shown in FIG. 2.

As shown in the example of FIG. 2, computing device 2 includes one or more processors 40, one or more input devices 42, one or more communication units 44, one or more output devices 46, one or more storage devices 48, and one or more sensors 56. One or more input devices 42 and one or more output device 46 may be examples of UIC 4 of FIG. 1. Storage devices 48 of computing device 2 also include UI module 20, application modules 12A-12N, operating system 26, and grammar checking module 10. Grammar checking module 10 may also include one or more neural networks 58, where the one or more neural networks may comprise sentence model 52 and prefix model 54. Communication channels 50 may interconnect each of the components 40, 42, 44, 46, 48, and 56 for inter-component communications (physically, communicatively, and/or operatively). In some examples, communication channels 50 may include a system bus, a network connection, one or more inter-process communication data structures, or any other components for communicating data between hardware and/or software.

One or more processors 40 may implement functionality and/or execute instructions within computing device 2. For example, processors 40 on computing device 2 may receive and execute instructions stored by storage devices 48 that provide the functionality of UI module 20, application modules 12, operating system 26, and grammar checking module 10 (including one or more neural networks 58). These instructions executed by processors 40 may cause computing device 2 to store and/or modify information, within storage devices 48 during program execution. Processors 40 may execute instructions of UI module 20, application modules 12, operating system 26, and grammar checking module 10 (including one or more neural networks 58) to perform one or more operations. That is, UI module 20, application modules 12, operating system 26, and grammar checking module 10 (including one or more neural networks 58) may be operable by processors 40 to perform various functions described herein.

One or more input devices 42 of computing device 2 may receive input. Examples of input are tactile, audio, kinetic, and optical input, to name only a few examples. Input devices 42 of computing device 2, in one example, include a mouse, keyboard, voice responsive system, video camera, buttons, control pad, microphone or any other type of device for detecting input from a human or machine. In some examples, input device 42 may be a presence-sensitive input device, which may include a presence-sensitive screen, touch-sensitive screen, etc.

One or more output devices 46 of computing device 2 may generate output. Examples of output are tactile, audio, and video output. Output devices 46 of computing device 2, in one example, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), Light-Emitting Diode (LED) or any other type of device for generating tactile, audio, and/or visual output.

One or more communication units 44 of computing device 2 may communicate with external devices by transmitting and/or receiving data. For example, computing device 2 may use communication units 44 to transmit and/or receive radio signals on a radio network such as a cellular radio network. In some examples, communication units 44 may transmit and/or receive satellite signals on a satellite network such as a Global Positioning System (GPS) network. Examples of communication units 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 48 within computing device 2 may store information for processing during operation of computing device 2. In some examples, storage device 48 is a temporary memory, meaning that a primary purpose of storage device 48 is not long-term storage. Storage devices 48 on computing device 2 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, application modules 12, operating system 26, and grammar checking module 10.

As shown in FIG. 2, computing device 2 may include one or more sensors 56. Sensors 56 may include an accelerometer that generates accelerometer data. Accelerometer data may indicate an acceleration and/or a change in acceleration of computing device 2. Sensors 56 may include a gyrometer that generates gyrometer data. Gyrometer data may indicate a physical orientation and/or change in physical orientation of computing device 2. In some examples, the orientation may be relative to one or more reference points. Sensors 56 may include a magnetometer that generates magnetometer data. Magnetometer data may indicate the magnetization of an object that is touching or in proximity to computing device 2. Magnetometer data may indicate the Earth's magnetic field, and in some examples, provide directional functionality of a compass. Sensors 56 may include an ambient light sensor that generates ambient light data. The ambient light data may indicate an intensity of light to which computing device 2 is exposed. Sensors 56 may include a proximity sensor that generates proximity data.

Proximity data may indicate whether an object is within proximity to computing device 2. In some examples, proximity data may indicate how close an object is to computing device 2. In some examples, sensors 56 may include a clock that generates a date and time. The date and time may be a current date and time.

As shown in FIG. 2, computing device 2 may include a power source 57 In some examples, power source 57 may be a battery. Power source 57 may provide power to one or more components of computing device 2. Examples of power source 57 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 57 may have a limited capacity (e.g., 1000-3000 mAh).

In accordance with techniques of the disclosure, computing device 2 may include one or more processors 40 that are configured to execute grammar checking module 10 to perform grammar checking of text inputted via, e.g., one or more input devices 42, at computing device 2, such as text inputted into text fields of applications 12 executing at one or more processors 40 or text fields provided by operating system 26 of computing device 2. In some examples, grammar checking module 10 may be part of an input method editor (IME), such as a virtual keyboard IME, that executes on one or more processors 40 to provide user controls that enable users of computing device 2 to enter text at computing device 2.

Grammar checking module 10 may, as the user enters text at computing device 2, execute on the one or more processors 40 to perform grammar checking on sequences of words entered by the user. Grammar checking module 10 may periodically perform grammar checking on sequences of words entered by the user. For example, grammar checking module 10 may perform grammar checking on each sentence entered by the user at computing device 2.

To perform such sentence-level grammar checking, grammar checking module 10 may determine that the user has completed inputting a sentence and, in response, perform grammar checking on the just-completed sentence. Grammar checking module 10 may determine that the user has completed inputting a sentence using any suitable technique.

For example, grammar checking module 10 may determine that the user has completed inputting a sentence in response to determining that the user has inputted an end mark (e.g., a period, a question mark, or an exclamation mark). In another example, grammar checking module 10 may determine that the user has completed inputting a sentence in response to detecting a long pause, such as a pause longer than one second, three seconds, and the like, in text input by the user. In another example, grammar checking module 10 may determine that the user has completed inputting a sentence in response to determining that the user has selected a different text input field than the text input field into which the user was inputting text.

Besides performing sentence-level grammar checking, grammar checking module 10 may perform grammar checking on sentence fragments or any other sequence of words inputted by the user. Performing grammar checking on sentence fragments may be useful in scenarios, such as inputting text at an instant messaging or chat application, where text inputted by the user may be fairly short and may not typically consist of multiple sentences, and may also be useful in for providing immediate feedback to the user, such as when the user makes a typing mistake mid-sentence. For example, grammar checking module 10 may perform grammar checking of text inputted by the user after every word inputted by the user, after every N words inputted by the user, where N is an integer such as three, five, ten, and the like, or in response to detecting a long pause in text input by the user. How frequently grammar checking module 10 performs grammar checking may depend on hardware resources, such as available processing capability of one or more processors 40, available power from power source 57, and the application that is receiving the text inputted by the user. In some examples, grammar checking module 10 may perform caching to enable grammar checking module 10 to more quickly perform grammar checking of partial sentences. For example, grammar checking module 10 may cache and reuse encoder representations of previously-checked partial sentences instead of recomputing encoder representations of the partial sentences.

Grammar checking module 10 may perform grammar checking of a sequence of words, such as the sequence of words making up a sentence when performing sentence-level grammar checking, or the sequence of words making up a sentence fragment, inputted by the user by generating, based on the sequence of words inputted by the user, a grammatically correct version of the sequence of words inputted by the user. Grammar checking module 10 may compare the sequence of words inputted by the user with the grammatically correct version of the sequence of words to determine if the sequence of words inputted by the user matches (e.g., is the same as) the grammatically correct version of the sequence of words. If grammar checking module 10 determines that the sequence of words inputted by the user does not match the grammatically correct version of the sequence of words, the grammar checking module 10 may determine that the sequence of words inputted by the user is not grammatically correct and may output, at one or more output devices 46, the grammatically correct version of the sequence of words as a suggested replacement for the sequence of words inputted by the user.

In some examples, grammar checking module 10 may, instead of outputting the grammatically correct version of the sequence of words as a suggested replacement for the sequence of words inputted by the user, output a suggested replacement for one or more words in the sequence of words inputted by the user that would make the sequence of words inputted by the user grammatically correct. For example, given the sequence of words "He think he's right," grammar checking module 10 may, instead of outputting the grammatically correct sentence "He thinks he's right" as a suggested replacement, output the word "thinks" as a suggested replacement for the word "think" in the sequence of words "He think he's right," and may highlight the word "think" in the sequence of words "He think he's right" to be replaced by the suggested replacement.

In some examples, grammar checking module 10 may output a plurality of grammatically correct versions of the sequence of words as a suggested replacement for the sequence of words inputted by the user. Grammar checking module 10 may determine, for the sequence of words inputted by the user, the probability of each of a plurality of sequence of words of being the grammatically correct versions of the sequence of words inputted by the user. Grammar checking module 10 may output the top M most probable grammatically correct versions of the sequence of words as the suggested replacement for the sequence of words inputted by the user, where M is an integer, or may output each sequence of words in the plurality of sequence of words having a probability of being the grammatically correct version of the sequence of words inputted by the user higher than a specified probability threshold (e.g., a probability threshold of 0.7, 0.8, and the like).

Grammar module 10 may implement and use one or more neural networks that execute on one or more processors 40 to perform on-device grammar checking on the text entered by the user. By using one or more neural networks that executes on one or more processors 40 to perform grammar checking, grammar checking module 10 does not send text off-device, such as to one or more neural networks operating in a cloud computing system, in order to perform grammar checking on text entered by the user.

To perform grammar checking on a sequence of words inputted by the user, grammar checking module 10 may input the sequence of words into one or more neural networks 58. One or more neural networks 58 may, in response, output a sequence of words that corresponds to the sequence of words inputted into one or more neural networks 58. That is, grammar checking module 10 may input a sequence of words into one or more neural networks 58 and one or more neural networks 58 may, in response output a sequence of words that is a grammatically correct version of the sequence of words inputted into one or more neural networks 58.

One or more neural networks 58 may be implemented as one or more sequence-to-sequence (seq2seq) neural networks, similar to neural networks for performing machine translation, that take a first sequence of words as input and, in response, output a second sequence of words that corresponds to the first sequence of words inputted into one or more neural networks 58. In particular, one or more neural networks 58 may be trained to take a first sequence of words as input and, in response, infer and output a grammatically correct version of the first sequence of words.

In some examples, each of one or more neural networks 58 may include a long short-term memory (LSTM) encoder and a LSTM decoder with attention, where the LSTM encoder and the LSTM decoder may each have two layers and 256 nodes. Inputs into each of one or more neural networks 58 are transformed using a word piece (e.g., arbitrary combination of characters) model with a vocabulary of 4,000, and model weights in one or more neural networks 58 are compressed to eight bits to save on storage and memory overhead in order to perform on-device grammar checking. While one or more neural networks 58 are described as including an LSTM encoder and an LSTM decoder, one or more neural networks 58 may include and utilize any suitable form of recurrent neural networks, such as a gated recurrent unit (GRU), or any other suitable forms of neural networks, such as a convolutional neural network (CNN).

One or more neural networks 58 may be trained off-device. That is, one or more neural networks 58 may be trained on a computing system external to computing device 2, such as on a cloud-based computing system, and then installed on computing device 2 to perform grammar checking.

One or more neural networks 58 may be trained using a technique called distillation or knowledge distillation to take a sequence of words, such as a sentence, as input and to output a sequence of words that is a grammatically correct version of the inputted sequence of words. To train one or more neural networks 58, a computing system for training one or more neural networks 58 may start with a teacher model, such as a server-side grammar error correction model, and may run the teacher model over webpages containing user-generated content, such as Wikipedia articles, message boards, social media websites, and the like. The computing system may, for each sentence from such webpages, input the sentence into the teacher model to generate one or more hypotheses of a grammatically correct version of the input sentence, and may select the top-1 hypothesis out of the one or more hypotheses as the ground truth label for the inputted sentence.

Through this process of training the teacher model, the computing system may generate a training set of millions of corrected examples (i.e., where the grammatically correct version of the input sentence does not match the input sentence), and millions of no-op examples (i.e., where there were no grammatical mistakes in the inputted sentence, such that the grammatically correct version of the input sentence matches the input sentence). If necessary, the computing system may subsample the no-op examples to create a dataset that is roughly balanced between the corrected examples and the no-op examples, and may use the created dataset to train one or more neural networks 58. In this way, one or more neural networks 58 may be trained to take a sequence of words, such as a sentence, as input and to output a sequence of words that is a grammatically correct version of the inputted sequence of words.

In some examples, one or more neural networks 58 may include separate neural networks for performing grammar checking on sentences and for performing grammar checking on sentence fragments. For example, one or more neural networks 58 may include sentence model 52, which may be a neural network model for performing grammar checking on sentences and prefix model 54, which may be a neural network model for performing grammar checking on partial sentences or other sentence fragments. One or more neural networks 58 may also include any other suitable neural networks, such as a paragraph-level model for performing grammar checking on paragraphs of words. While sentence model 52 may be trained according to the above-described techniques, a computing system may use a different training technique to train prefix model 54.

Similar to the training technique described above, prefix model 54 may be trained off-device at a computing system external to computing device 2. The computing system may train prefix model 54 using input examples of sentence prefixes that are the result of randomly truncating sentences, where the sentences that are truncated may contain grammatical errors that can be fixed by modifying the resulting sentence prefixes.

In some examples, the computing system may train prefix model 54 with a <bad, good> sentence pair, which may be a sentence pair containing a "bad" sentence that contains grammatical errors and a "good" sentence that is a grammatically correct version of the "bad" sentence, such as the sentence pair <[I am go to the store], [I am going to the store]>. The computing system may align the sentence pair and determine an aligned random prefix (e.g., a prefix having the same number of words) of both sentences to determine a <bad, good> sentence prefix pair, which may be a sentence prefix pair containing a "bad" sentence prefix that contains grammatical errors and a "good" sentence prefix that is a grammatically correct version of the "bad" sentence prefix, such as <[I am go], [I am going]>. The computing system may therefore use aligned random prefix pairs as training data to train prefix model 54 to perform grammar checking on partial sentences.

In some examples, the computing system may determine whether a <bad, good> sentence prefix pair actually contains a "bad" sentence prefix that contains grammatical errors. For example, given the sentence pair <[He goes to the store yesterday.], [He went to the store yesterday.]>, an aligned random prefix of both sentences may be a <bad, good> sentence prefix pair of <[He goes to], [He went to]>. In this example, the "bad" sentence prefix [He goes to] may actually be a grammatically correct prefix. To test whether a "bad" sentence prefix is grammatically correct, computing system may run the "bad" sentence prefix through a sentence completion model to generate a sentence having the "bad" sentence prefix, such as the sentence [He goes to bed.], and may then run a full-sentence grammar checker on the completed sentence.

If the completed "bad" prefix sentence is grammatically correct, the computing system may generate a <bad, bad> sentence prefix pair and may use the generated <bad, good> sentence prefix pair to train prefix model 54 instead of the <bad prefix, good> sentence prefix pair. For example, for the "bad" sentence prefix that is determined to be grammatically correct, such as the "bad sentence prefix [He goes to], the computing system may generate a <bad, bad> sentence prefix pair of <[He goes to], [He goes to]> and may use the <bad, bad> sentence prefix pair of <[He goes to], [He goes to]> to train prefix model 54. In this way, the computing system may train prefix model 54 to generate grammatically correct sentence fragments.

In some examples, grammar checking module 10 may determine whether to use sentence model 52 or prefix model 54 to perform grammar checking of a sequence of words. For example, if grammar checking module 10 determines that the sequence of words to be grammar checked is a sentence, such as via the techniques described above, grammar checking module 10 may determine to use sentence model 52 to perform grammar checking on the sequence of words. In another example, if grammar checking module 10 determines that the sequence of words to be grammar checked is a sentence fragment, such as via the techniques described above, grammar checking module 10 may determine to use prefix model 54 to perform grammar checking on the sequence of words.

In some examples, grammar checking module 10 may determine whether to use sentence model 52 or prefix model 54 to perform grammar checking of a sequence of words based on the application that received the sequence of words. For example, if grammar checking module 10 determines that the sequence of words was inputted into a text messaging application, grammar checking module 10 may determine to use prefix model 54 to perform grammar checking on the sequence of words. In another example, if grammar checking module 10 determines that the sequence of words was inputted into an e-mail client, grammar checking module 10 may determine to use sentence model 52 to perform grammar checking on the sequence of words.

In some examples, the determination of whether to use sentence model 52 or prefix model 54 may be user-specific. Grammar checking module 10 may, for an application, track and/or otherwise determine the typical input length (e.g., the number of words inputted) by the user to determine an expected input length by the user. If the expected input length is less than a specified threshold, grammar checking module 10 may determine to use prefix model 54 to perform grammar checking. Otherwise, if the expected input length is greater than or equal to the specified threshold, grammar checking module 10 may determine to use sentence model 52 to perform grammar checking.

In some examples, instead of using separate sentence model 52 or prefix model 54 to perform grammar checking of a sequence of words, one or more neural networks 58 may be trained to use a single model for performing grammar checking of both sentences and sentence fragments. For example, sentence model 52 may be trained using a large sentence model and a large prefix model as teacher models for distillation, as described above. For example, the large prefix model may be trained according to the techniques described above with respect to training prefix model 54. The large sentence model may be trained using <bad, good> sentence pairs to learn good (i.e., grammatically correct sentences that correspond to bad (i.e., grammatically incorrect) sentences, in a similar fashion to the training of prefix model 54. The neural network 58 may therefore be trained using the large sentence model and the large prefix model as teacher models for distillation to generate a single model for performing grammar checking of both sentences and sentence fragments. Using a single model to perform grammar checking of both sentences and sentence fragments may potentially utilize less memory in computing device 2 or may potentially provide better quality grammar checking while utilizing a similar amount of memory in computing device 2 compared with using separate models to perform grammar checking of both sentences and sentence fragments.

Grammar checking module 10 may determine, based on the sequence of words outputted by one or more neural networks 58, a grammatically correct version of the sequence of words inputted by the user. For example, grammar checking module 10 may determine the sequence of words outputted by one or more neural networks 58 to be a grammatically correct version of the sequence of words inputted by the user. In another example, grammar checking module 10 may perform post processing on the sequence of words outputted by one or more neural networks 58 to modify the sequence of words outputted by one or more neural networks 58, and may determine the modified sequence of words outputted by one or more neural networks 58 to be a grammatically correct version of the sequence of words inputted by the user.

In some examples, grammar checking module 10 may, utilize heuristics or one or more other neural networks to perform post processing of the sequence of words outputted by one or more neural networks 58 and may determine, based on the post processed sequence of words outputted by one or more neural networks 58, a grammatically correct version of the sequence of words inputted by the user. Grammar checking module 10 may perform such post processing to determine whether to modify the sequence of words outputted by one or more neural networks 58 in order to determine a grammatically correct version of the sequence of words inputted by the user. Furthermore grammar checking module 10 may perform such post processing to determine whether to output a grammatically correct version of the sequence of words inputted by the user as a suggested replacement for the sequence of words inputted by the user.

Grammar checking module 10 may perform post processing of the sequence of words outputted by one or more neural networks 58 by modifying the sequence of words outputted by one or more neural networks 58 to match the gender of the pronouns in the sequence of words outputted by one or more neural networks 58 with the gender of the pronouns in the sequence of words inputted by the user. For example, if the sequence of words inputted by the user includes feminine pronouns such as "she" and "her", grammar checking module 10 may modify the sequence of words outputted by one or more neural networks 58 to replace masculine pronouns such as "he" and "him" with the corresponding feminine pronouns in order to match the gender of the pronouns in the sequence of words outputted by one or more neural networks 58 with the gender of the pronouns in the sequence of words inputted by the user. Grammar checking module 10 may therefore determine the modified sequence of words outputted by one or more neural networks 58 to be a grammatically correct version of the sequence of words inputted by the user.

Grammar checking module 10 may perform post processing of the sequence of words outputted by one or more neural networks 58 by modifying the sequence of words outputted by one or more neural networks 58 to match the subject in the sequence of words outputted by one or more neural networks 58 with the subject agreement in the sequence of words inputted by the user. For example, if the sequence of words inputted by the user includes a singular subject, grammar checking module 10 may modify the sequence of words outputted by one or more neural networks 58 to replace a plural subject with the corresponding singular subject and may also replace a plural verb with a singular verb. Grammar checking module 10 may therefore determine the modified sequence of words outputted by one or more neural networks 58 to be a grammatically correct version of the sequence of words inputted by the user.

The sequence of words outputted by one or more neural networks 58 may include one or more emojis. As such, grammar checking module 10 may also perform post processing of the sequence of words outputted by one or more neural networks 58 by modifying the sequence of words outputted by one or more neural networks 58 to match the skin tone of one or more emojis in the sequence of words outputted by one or more neural networks 58 with the skin tone of one or more emojis in the gender of the pronouns in the sequence of words inputted by the user. For example, if the sequence of words inputted by the user includes one or more emojis having a medium-dark skin tone, grammar checking module 10 may modify the sequence of words outputted by one or more neural networks 58 to replace the one or more emojis having a skin tone other than a medium-dark skin tone in the sequence of words outputted by one or more neural networks 58 with the corresponding one or more emojis having a medium-dark skin tone, in order to match the one or more emojis in the sequence of words outputted by one or more neural networks 58 with the one or more emojis in the sequence of words inputted by the user. Grammar checking module 10 may therefore determine the modified sequence of words outputted by one or more neural networks 58 to be a grammatically correct version of the sequence of words inputted by the user.

In some examples, as part of post processing of the sequence of words outputted by one or more neural networks 58, grammar checking module 10 may also perform one or more sanity checks on the sequence of words outputted by one or more neural networks 58. If grammar checking module 10 determines that the sequence of words outputted by one or more neural networks 58 does not pass the one or more sanity checks, grammar checking module 10 may refrain from outputting a grammatically correct version of the sequence of words inputted by the user as a suggested replacement for the sequence of words inputted by the user.

In general, grammar checking module 10 performs one or more sanity checks to ensure that the sequence of words outputted by one or more neural networks 58 make sense as an intelligible sequence of words. For example, grammar checking module 10 may determine whether the sequence of words outputted by one or more neural networks 58 includes a subject and a verb.

In some examples, grammar checking module 10 may perform post processing of the sequence of words outputted by one or more neural networks 58 to determine whether the sequence of words include sensitive subject matter, such as by using a sensitive topics classifier or via any other suitable technique. Some example sensitive matters include, but are not limited to, deaths, funerals, crimes, job losses, job rejections, academic rejections, and the like. If grammar checking module 10 determines that the sequence of words include sensitive subject matter, grammar checking module 10 may refrain from outputting a grammatically correct version of the sequence of words inputted by the user as a suggested replacement for the sequence of words inputted by the user.

If grammar checking module 10 determines not to refrain from outputting a grammatically correct version of the sequence of words inputted by the user as a suggested replacement for the sequence of words inputted by the user, grammar checking module 10 may determine whether the sequence of words inputted by the user matches grammatically correct version of the sequence of words. If grammar checking module 10 determines the sequence of words inputted by the user matches the grammatically correct version of the sequence of words inputted by the user, grammar checking module 10 may determine that the sequence of words inputted by the user is grammatically correct, and may refrain from outputting a grammatically correct version of the sequence of words.

If grammar checking module 10 determines the sequence of words inputted by the user does not match the grammatically correct version of the sequence of words inputted by the user, grammar checking module 10 may output the grammatically correct version of the sequence of words inputted by the user as a suggested replacement for the sequence of words inputted by the user. If the user selects the suggested replacement for the sequence of words inputted by the user, grammar checking module 10 may replace, in text being edited by the user, the sequence of words inputted by the user with the grammatically correct version of the sequence of words inputted by the user. In this way, computing device 2 may use grammar checking module 10 to perform grammar checking of text being edited by the user.

If grammar checking module 10 determines not to refrain from outputting a grammatically correct version of the sequence of words inputted by the user as a suggested replacement for the sequence of words inputted by the user, grammar checking module 10 may determine whether the sequence of words inputted by the user and grammar checked by grammar checking module 10 matches the grammatically correct version of the sequence of words generated by grammar checking module 10. If grammar checking module 10 determines the sequence of words inputted by the user matches the grammatically correct version of the sequence of words generated by grammar checking module 10, grammar checking module 10 may determine that the sequence of words inputted by the user is grammatically correct, and may refrain from outputting a grammatically correct version of the sequence of words as a suggested replacement for the sequence of words inputted by the user and grammar checked by grammar checking module 10.

If grammar checking module 10 determines the sequence of words inputted by the user and grammar checked by grammar checking module 10 does not match the grammatically correct version of the sequence of words outputted by grammar checking module 10, grammar checking module 10 may output, such as at one or more output devices 46, the grammatically correct version of the sequence of words inputted by the user as a suggested replacement for the sequence of words inputted by the user. If the user selects the suggested replacement for the sequence of words inputted by the user, grammar checking module 10 may replace, in text being edited by the user, the sequence of words inputted by the user with the grammatically correct version of the sequence of words inputted by the user. In this way, computing device 2 may use grammar checking module 10 to perform grammar checking of text being edited by the user.

As grammar checking module 10 executes on one or more processors 40 of computing device 2 to perform grammar checking of text inputted by a user of computing device 2, grammar checking module 10 may further retrain and/or fine-tune one or more neural networks 58 based on the results of performing grammar checking and user interactions with suggested replacements outputted by grammar checking module 10. Grammar checking module 10 may retrain one or more neural networks 58 by adjusting one or more weights in one or more neural networks 58 based on user interactions with suggested replacements outputted by grammar checking module 10. For instance, given a first sequence of words grammar checked by grammar checking module 10 and a second sequence of words determined by grammar checking module 10 to be the suggested replacement for the corresponding first sequence of words, if the user rejects replacing the first sequence of words with the suggested replacement, grammar checking module 10 may update one or more weights to lower the probability that grammar checking module 10 will suggest replacing the first sequence of words with the second sequence of words.

As grammar checking module 10 performs retraining and/or fine-tuning of one or more neural networks 58 to generate one or more updated models, grammar checking module 10 may send the one or more updated models to an external computing system, such that the one or more updated models may then be distributed to other computing devices. To preserve user privacy, grammar checking module 10 may refrain from sending data samples used to retrain and update one or more neural networks 58 to an external computing system. Instead, grammar checking module 10 may send, for example, updated weights aggregated across a number of examples to an external computing system.

In some examples, grammar checking module 10 may perform federated training of one or more neural networks 58 by coordinating training of one or more neural networks 58 with other computing devices that also utilize neural networks to perform grammar checking. By performing federated training, grammar checking module 10 may share updated grammar checking models with other computing devices that also utilize neural networks to perform grammar checking and may also receive updated grammar checking models from such other computing devices. For example, computing device 2 and other computing devices may communicate with an external computing system to send updated models to the external computing system and to receive updated models from the external computing system. When grammar checking module 10 receives an updated model from another computing device or from an external computing system, grammar checking module 10 may update one or more neural networks 58 with the updated model, such as by replacing the weights in one or more neural networks 58 with the weights in the updated model, by averaging the weights in one or more neural networks 58 with the weights in the updated model, and the like.

In some examples, grammar checking module 10 may select one or more computing devices with which grammar checking module 10 may perform federated learning based on one or more characteristics of the one or more computing devices. For example, grammar checking module 10 may select one or more computing devices based on the location of the one or more computing devices, such that grammar checking module 10 may select one or more computing devices that are in the same locale (e.g., same city), same region (e.g., same country), and the like. For example, if grammar checking module 10 is primarily used to perform grammar checking on Russian language texts, grammar checking module 10 may select one or more computing devices that are in Russian-speaking countries with which grammar checking module 10 may perform federated learning.

Figure 3:
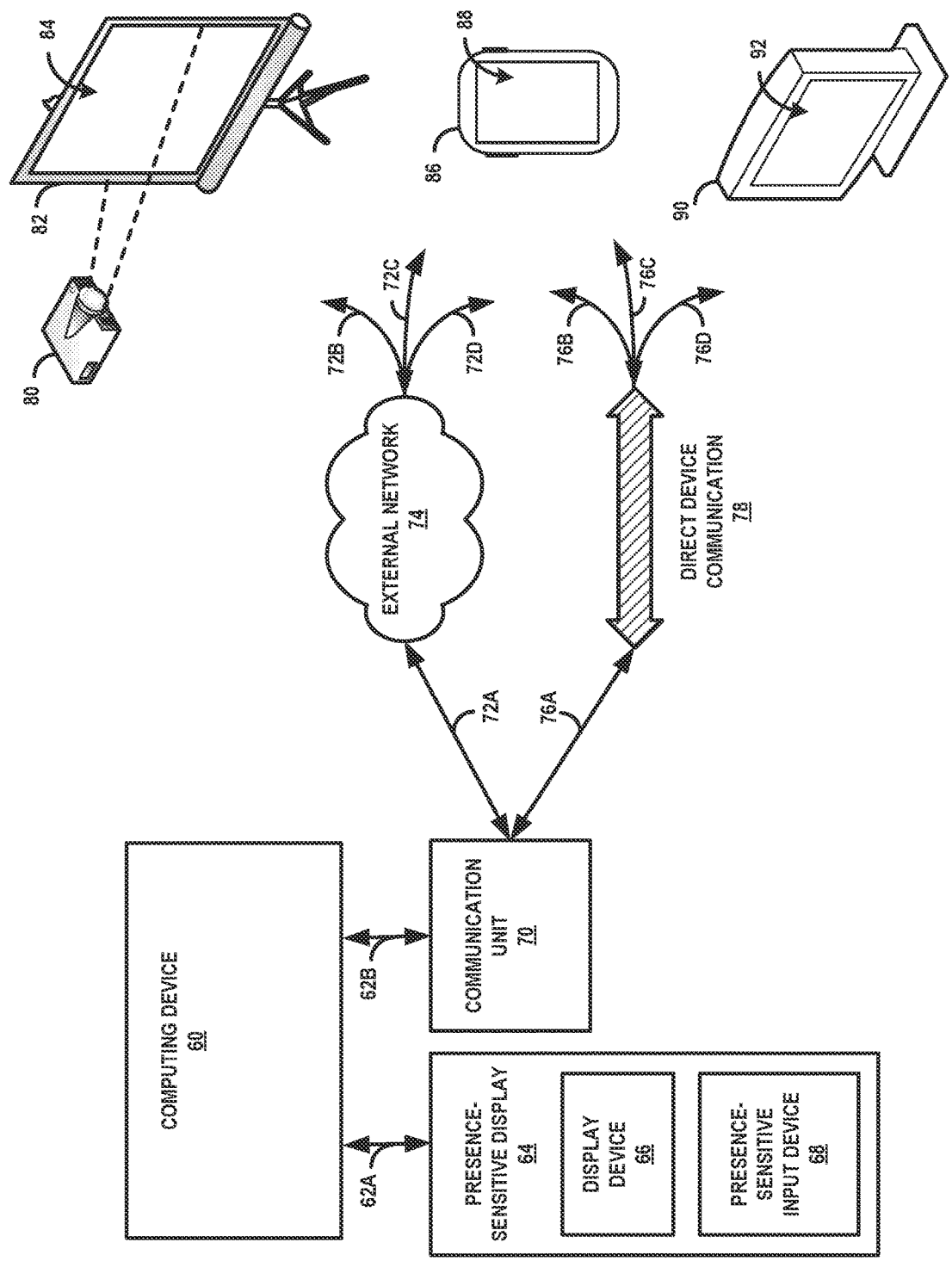
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 60, a presence-sensitive display 64, communication unit 70, projector 80, projector screen 82, mobile device 86, and visual display device 90. In some examples, presence-sensitive display 64 may be a presence-sensitive display as described in FIGS. 1-2. Although shown for purposes of example in FIGS. 1 and 2 as a stand-alone computing device 2, a computing device such as computing device 60 may, generally, be any component or system that includes a processor or other suitable computing environment for executing software instructions and, for example, need not include a presence-sensitive display.

As shown in the example of FIG. 3, computing device 60 may be an example of computing device 2 of FIGS. 1-2, and may include a processor that includes functionality as described with respect to one or more processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 64, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices (e.g., input devices, output devices, memory, storage devices) that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of presence-sensitive display 84 and/or 64 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of presence-sensitive display 84 and/or 64 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to external network 74 by one of respective network links 72B, 72C, or 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may receive text inputted at presence-sensitive display 64, presence-sensitive display 84, presence-sensitive display 88, or presence-sensitive display 92, and may, in response, perform grammar checking of a first sequence of words in the inputted text. To perform grammar checking of the first sequence of words, computing device 60 may input the sequence of words into one or more neural networks. The one or more neural networks may, in response, generate a second sequence of words that correspond to the first sequence of words. Computing device 60 may determine, based on the second sequence of words, a grammatically correct version of the first sequence of words, and may output, at presence-sensitive display 64, presence-sensitive display 84, presence-sensitive display 88, or presence-sensitive display 92, the grammatically correct version of the first sequence of words as a suggested replacement for the first sequence of words in the inputted text. Computing device 60 may, in response to receiving user input at presence-sensitive display 64, presence-sensitive display 84, presence-sensitive display 88, or presence-sensitive display 92 selecting the grammatically correct version of the first sequence of words, update the inputted text to replace the first sequence of words with the grammatically correct version of the first sequence of words.

Figure 4:
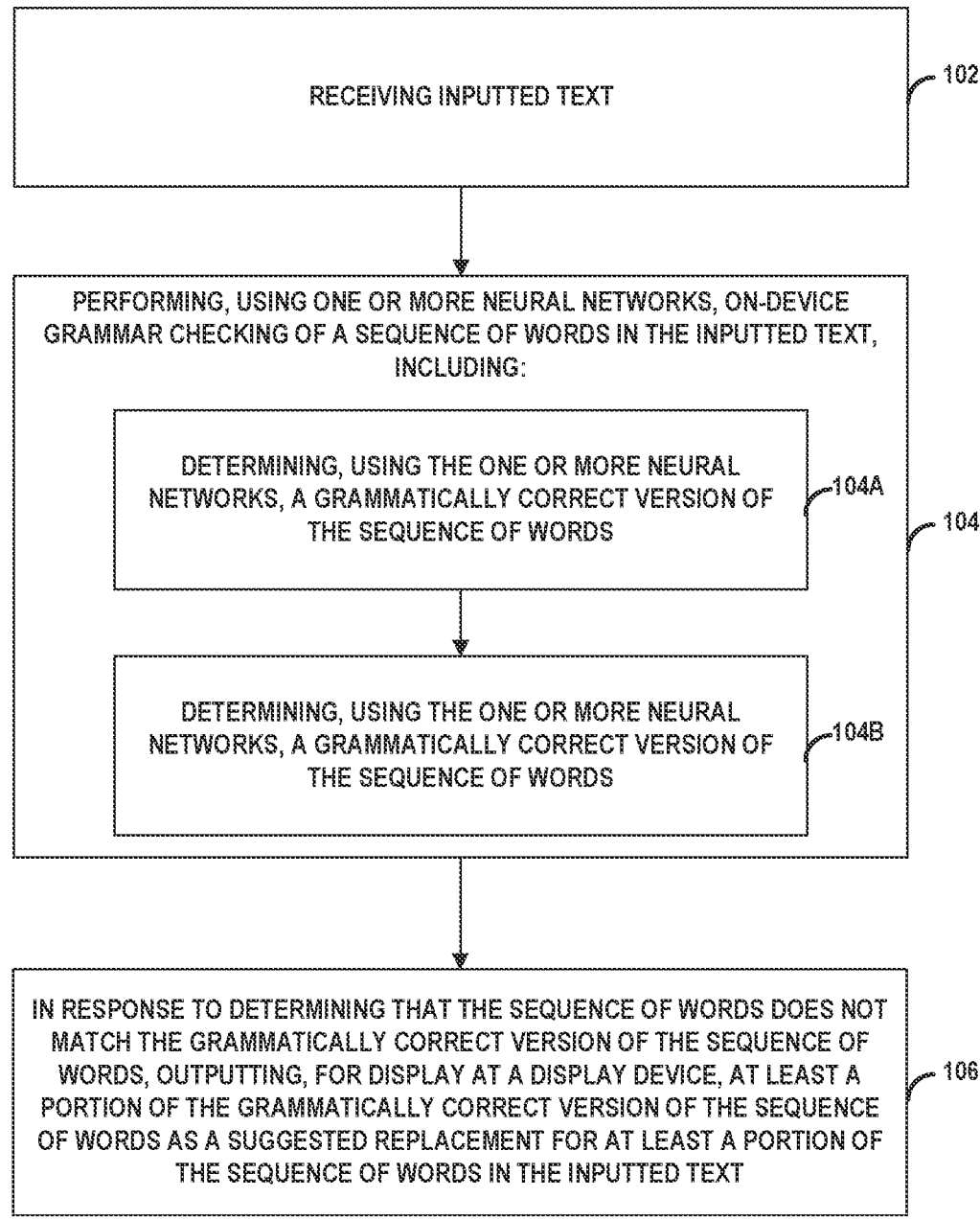
FIG. 4 is a flowchart illustrating an example mode of operation for a computing device to perform on-device grammar checking of inputted text, in accordance with one or more techniques of the present disclosure.

FIG. 4 is a flowchart illustrating an example mode of operation for a computing device to perform on-device grammar checking of inputted text, in accordance with one or more techniques of the present disclosure. FIG. 4 is described below in the context of computing device 2 of FIGS. 1 and 2. As shown in FIG. 4, computing device 2 may receive inputted text, via, e.g., one or more input devices 42 (102). Computing device 2 may perform, using one or more neural networks 58, on-device grammar checking of a sequence of words in the inputted text (104), including: determining, using the one or more neural networks 58, a grammatically correct version of the sequence of words (104A) and determining that the sequence of words does not match the grammatically correct version of the sequence of words (104B). Computing device 2 may, in response to determining that the sequence of words does not match the grammatically correct version of the sequence of words, output, for display at a display device, such as one or more output devices 46, at least a portion of the grammatically correct version of the sequence of words as a suggested replacement for at least a portion of the sequence of words in the inputted text (106).

In some examples, computing device 2 may, in response to receiving an indication of user input that corresponds to accepting at least the portion of the grammatically correct version of the sequence of words as the replacement for at least the portion of the sequence of words in the inputted text, replace at least the portion of the sequence of words in the inputted text with at least the portion of the grammatically correct version of the sequence of words.

In some examples, to determine the grammatically correct version of the sequence of words, computing device 2 may input the sequence of words into the one or more neural networks 58 to generate a second sequence of words that corresponds to the sequence of words and may perform post-processing of the second sequence of words to generate the grammatically correct version of the sequence of words.

In some examples, to perform the post-processing of the second sequence of words to generate the grammatically correct version of the sequence of words, computing device 2 may modify a pronoun in the second sequence of words to match a gender of a pronoun in the sequence of words and determine the second sequence of words having the modified pronoun as the grammatically correct version of the sequence of words.

In some examples, to perform the post-processing of the second sequence of words to generate the grammatically correct version of the sequence of words, computing device 2 may modify a subject in the second sequence of words to match a subject in the sequence of words and determine the second sequence of words having the modified subject as the grammatically correct version of the sequence of words.

In some examples, to perform the post-processing of the second sequence of words to generate the grammatically correct version of the sequence of words, computing device 2 may insert a first one or more emojis in the second sequence of words to match a second one or more emojis in the sequence of words and determine the second sequence of words having the first one or more emojis as the grammatically correct version of the sequence of words.

In some examples, computing device 2 may further perform, using the one or more neural networks 58, on-device grammar checking of a third sequence of words in the inputted text, including: inputting the third sequence of words into the one or more neural networks to generate a fourth sequence of words that corresponds to the third sequence of words and determining that the third sequence of words includes a sensitive topic. Computing device 2 may, in response to determining that the third sequence of words includes a sensitive topic, refrain from outputting a suggested replacement for the third sequence of words in the inputted text.

In some examples, the one or more neural networks 58 comprises a sentence model 52 for performing grammar checking of sentences and a prefix model 54 for performing grammar checking of sentence fragments. In some examples, computing device 2 may determine whether to use the sentence model 52 or the prefix model 54 to perform grammar checking of the sequence of words based at least in part on determining whether the sequence of words is a sentence or whether the sequence of words is a sentence fragment. In some examples, computing device 2 may determine whether to use the sentence model 52 or the prefix model 54 to perform grammar checking of the sequence of words based at least in part on an application that received the inputted text including the sequence of words.

In some examples, the one or more neural networks 58 comprise a sequence-to-sequence model containing a long short-term memory (LSTM) encoder and a LSTM decoder with attention.

In some examples, the one or more neural networks 58 are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence. In some examples, the training set is determined using distillation. In some examples, the training set is determined by using a server-side grammar error correction model as a teacher model over web pages containing user-generated content.

In some examples, the prefix model 54 is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

In some examples, computing device 2 may update the one or more neural networks 58 based at least in part on whether the grammatically correct version of the sequence of words is accepted as the suggested replacement for the sequence of words in the inputted text.

In some examples, computing device 2 may perform federated training of the one or more neural networks 58 to update the one or more neural networks 58 with data received from one or more computing devices. In some examples, computing device 2 may select the one or more computing device with which the computing device performs federated training of the one or more neural networks 58 based at least in part on locations of the one or more computing devices.

In some examples, to perform, using the one or more neural networks 58, on-device grammar checking of the sequence of words in the inputted text, computing device 2 may execute a system-wide input method editor (IME) that includes the one or more neural networks 58.

In some examples, to determine the grammatically correct version of the sequence of words, computing device 2 may determine, using the one or more neural networks 58, a plurality of grammatically versions of the sequence of words. In some examples, to determine that the sequence of words does not match the grammatically correct version of the sequence of words, computing device 2 may determine that the sequence of words does not match any one of the plurality of grammatically versions of the sequence of words. In some examples, to output, for display at the display device, at least the portion of the grammatically correct version of the sequence of words as the suggested replacement for at least a portion of the sequence of words in the inputted text, computing device 2 may output, in response to determining that the sequence of words does not match any one of the plurality of grammatically versions of the sequence of words, for display at the display device, the plurality of grammatically versions of the sequence of words as the suggested replacement for the sequence of words in the inputted text.

This disclosure contains the following examples:

Example 1: A method includes receiving, by a computing device, inputted text; performing, by the computing device using one or more neural networks, on-device grammar checking of a sequence of words in the inputted text, including: determining, by the computing device and using the one or more neural networks, a grammatically correct version of the sequence of words, and determining, by the computing device, that the sequence of words does not match the grammatically correct version of the sequence of words; and in response to determining that the sequence of words does not match the grammatically correct version of the sequence of words, outputting, by the computing device and for display at a display device, at least a portion of the grammatically correct version of the sequence of words as a suggested replacement for at least a portion of the sequence of words in the inputted text.

Example 2: The method of example 1, further includes in response to receiving an indication of user input that corresponds to accepting at least the portion of the grammatically correct version of the sequence of words as the replacement for at least the portion of the sequence of words in the inputted text, replacing, by the computing device, at least the portion of the sequence of words in the inputted text with at least the portion of the grammatically correct version of the sequence of words.

Example 3: The method of any of examples 1 and 2, wherein determining the grammatically correct version of the sequence of words further comprises: inputting, by the computing device, the sequence of words into the one or more neural networks to generate a second sequence of words that corresponds to the sequence of words; and performing, by the computing device, post-processing of the second sequence of words to generate the grammatically correct version of the sequence of words.

Example 4: The method of example 3, wherein performing the post-processing of the second sequence of words to generate the grammatically correct version of the sequence of words further comprises: modifying, by the computing device, a pronoun in the second sequence of words to match a gender of a pronoun in the sequence of words; and determining, by the computing device, the second sequence of words having the modified pronoun as the grammatically correct version of the sequence of words.

Example 5: The method of any of examples 3 and 4, wherein performing the post-processing of the second sequence of words to generate the grammatically correct version of the sequence of words further comprises: modifying, by the computing device, a subject in the second sequence of words to match a subject in the sequence of words; and determining, by the computing device, the second sequence of words having the modified subject as the grammatically correct version of the sequence of words.

Example 6: The method of any of examples 3-5, wherein performing the post-processing of the second sequence of words to generate the grammatically correct version of the sequence of words further comprises: inserting, by the computing device, a first one or more emojis in the second sequence of words to match a second one or more emojis in the sequence of words; and determining, by the computing device, the second sequence of words having the first one or more emojis as the grammatically correct version of the sequence of words.

Example 7: The method of any of examples 1-6, further includes performing, by the computing device using the one or more neural networks, on-device grammar checking of a third sequence of words in the inputted text, including: inputting, by the computing device, the third sequence of words into the one or more neural networks to generate a fourth sequence of words that corresponds to the third sequence of words; and determining, by the computing device, that the third sequence of words includes a sensitive topic; and in response to determining that the third sequence of words includes the sensitive topic, refraining, by the computing device, from outputting a suggested replacement for the third sequence of words in the inputted text.

Example 8: The method of any of examples 1-7, wherein the one or more neural networks comprises a sentence model for performing grammar checking of sentences and a prefix model for performing grammar checking of sentence fragments.

Example 9: The method of example 8, further includes determining, by the computing device, whether to use the sentence model or the prefix model to perform grammar checking of the sequence of words based at least in part on determining whether the sequence of words is a sentence or whether the sequence of words is a sentence fragment.

Example 10: The method of any of examples 8 and 9, further includes determining, by the computing device, whether to use the sentence model or the prefix model to perform grammar checking of the sequence of words based at least in part on an application that received the inputted text including the sequence of words.

Example 11: The method of any of examples 1-10, wherein the one or more neural networks comprise a sequence-to-sequence model containing a long short-term memory (LSTM) encoder and a LSTM decoder with attention.

Example 12: The method of any of examples 1-10, wherein the one or more neural networks are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence.

Example 13: The method of example 12, wherein the training set is determined using distillation.

Example 14: The method of example 13, wherein the training set is determined by using a server-side grammar error correction model as a teacher model over web pages containing user-generated content.

Example 15: The method of any of examples 8-14, wherein the prefix model is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

Example 16: The method of any of examples 1-15, further includes updating, by the computing device, the one or more neural networks based at least in part on whether the grammatically correct version of the sequence of words is accepted as the suggested replacement for the sequence of words in the inputted text.

Example 17: The method of any of examples 1-16, further includes performing, by the computing device, federated training of the one or more neural network to update the one or more neural networks with data received from one or more computing devices.

Example 18: The method of example 17, further includes selecting, by the computing device, the one or more computing device with which the computing device performs federated training of the one or more neural network based at least in part on locations of the one or more computing devices.

Example 19: The method of any of examples 1-18, wherein performing, using the one or more neural networks, on-device grammar checking of the sequence of words in the inputted text further comprises: executing, by the computing device, a system-wide input method editor (IME) that includes the one or more neural networks.

Example 20: The method of any of examples 1-19, wherein: determining the grammatically correct version of the sequence of words comprises determining, by the computing device and using the one or more neural networks, a plurality of grammatically versions of the sequence of words; determining that the sequence of words does not match the grammatically correct version of the sequence of words comprises determining, by the computing device, that the sequence of words does not match any one of the plurality of grammatically versions of the sequence of words; and outputting, by the computing device and for display at the display device, at least the portion of the grammatically correct version of the sequence of words as the suggested replacement for at least a portion of the sequence of words in the inputted text further comprises in response to determining that the sequence of words does not match any one of the plurality of grammatically versions of the sequence of words, outputting, by the computing device and for display at the display device, the plurality of grammatically versions of the sequence of words as the suggested replacement for the sequence of words in the inputted text.

Example 21: A computing device includes a memory; one or more processors configured to: receive inputted text; perform, using one or more neural networks executing at the one or more processors, on-device grammar checking of a sequence of words in the inputted text, including: determining, using the one or more neural networks, a grammatically correct version of the sequence of words, and determining that the sequence of words does not match the grammatically correct version of the sequence of words; and in response to determining that the sequence of words does not match the grammatically correct version of the sequence of words, output, for display at a display device, at least a portion the grammatically correct version of the sequence of words as a suggested replacement for at least a portion of the sequence of words in the inputted text.

Example 22: The computing device of example 21, wherein the one or more processors are further configured to: in response to receiving an indication of user input that corresponds to accepting at least the portion of the grammatically correct version of the sequence of words as the suggested replacement for at least the portion of the sequence of words in the inputted text, replace at least the portion of the sequence of words in the inputted text with at least the portion of the grammatically correct version of the sequence of words.

Example 23: The computing device of any of examples 21 and 22, wherein to determine the grammatically correct version of the sequence of words, the one or more processors are further configured to: input the sequence of words into the one or more neural networks to generate a second sequence of words that corresponds to the sequence of words; and perform post-processing of the second sequence of words to generate the grammatically correct version of the sequence of words.

Example 24: The computing device of example 23, wherein to perform the post-processing of the second sequence of words to generate the grammatically correct version of the sequence of words, the one or more processors are further configured to: modify a pronoun in the second sequence of words to match a gender of a pronoun in the sequence of words; and determine the second sequence of words having the modified pronoun as the grammatically correct version of the sequence of words.

Example 25: The computing device of any of examples 23 and 24, wherein to perform the post-processing of the second sequence of words to generate the grammatically correct version of the sequence of words, the one or more processors are further configured to: modify a subject in the second sequence of words to match a subject in the sequence of words; and determine the second sequence of words having the modified subject as the grammatically correct version of the sequence of words.

Example 26: The computing device of any of examples 23-25, wherein to perform the post-processing of the second sequence of words to generate the grammatically correct version of the sequence of words, the one or more processors are further configured to: insert a first one or more emojis in the second sequence of words to match a second one or more emojis in the sequence of words; and determine the second sequence of words having the first one or more emojis as the grammatically correct version of the sequence of words.

Example 27: The computing device of any of examples 21-26, wherein the one or more processors are further configured to: perform, using the one or more neural networks, on-device grammar checking of a third sequence of words in the inputted text, including: inputting the third sequence of words into the one or more neural networks to generate a fourth sequence of words that corresponds to the third sequence of words; and determining that the third sequence of words includes a sensitive topic; and in response to determining that the third sequence of words includes the sensitive topic, refrain from outputting a suggested replacement for the third sequence of words in the inputted text.

Example 28: The computing device of any of examples 21-27, wherein the one or more neural networks comprises a sentence model for performing grammar checking of sentences and a prefix model for performing grammar checking of sentence fragments.

Example 29: The computing device of example 28, wherein the one or more processors are further configured to: determine whether to use the sentence model or the prefix model to perform grammar checking of the sequence of words based at least in part on determining whether the sequence of words is a sentence or whether the sequence of words is a sentence fragment.

Example 30: The computing device of any of examples 28 and 29, wherein the one or more processors are further configured to: determine whether to use the sentence model or the prefix model to perform grammar checking of the sequence of words based at least in part on an application that received the inputted text including the sequence of words.

Example 31: The computing device of any of examples 21-30, wherein the one or more neural networks comprise a sequence-to-sequence model containing a long short-term memory (LSTM) encoder and a LSTM decoder with attention.

Example 32: The computing device of any of examples 21-31, wherein the one or more neural networks are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence.

Example 33: The computing device of example 32, wherein the training set is determined using distillation.

Example 34: The computing device of example 33, wherein the training set is determined by using a server-side grammar error correction model as a teacher model over web pages containing user-generated content.

Example 35: The computing device of any of examples 28-34, wherein the prefix model is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

Example 36: The computing device of any of examples 21-35, wherein the one or more processors are further configured to: update the one or more neural networks based at least in part on whether the grammatically correct version of the sequence of words is accepted as the suggested replacement for the sequence of words in the inputted text.

Example 37: The computing device of any of examples 21-36, wherein the one or more processors are further configured to: perform federated training of the one or more neural networks to update the one or more neural networks with data received from one or more computing devices.

Example 38: The computing device of example 37, wherein the one or more processors are further configured to: select the one or more computing device with which the computing device performs federated training of the one or more neural networks based at least in part on locations of the one or more computing devices.

Example 39: The computing device of any of examples 21-38, wherein to perform, using the one or more neural networks, on-device grammar checking of the sequence of words in the inputted text, the one or more processors are further configured to: execute a system-wide input method editor (IME) that includes the one or more neural networks.

Example 40: The computing device of any of examples 21-39, wherein: to determine the grammatically correct version of the sequence of words, the one or more processors are further configured to determine, using the one or more neural networks, a plurality of grammatically versions of the sequence of words; to determine that the sequence of words does not match the grammatically correct version of the sequence of words, the one or more processors are further configured to determine that the sequence of words does not match any one of the plurality of grammatically versions of the sequence of words; and to output, for display at the display device, at least the portion of the grammatically correct version of the sequence of words as the suggested replacement for at least a portion of the sequence of words in the inputted text, the one or more processors are further configured to output, in response to determining that the sequence of words does not match any one of the plurality of grammatically versions of the sequence of words, for display at the display device, the plurality of grammatically versions of the sequence of words as the suggested replacement for the sequence of words in the inputted text.

Example 41: A computer-readable storage medium storing instructions that, when executed, cause one or more processors of a computing device to: receive inputted text; perform, using one or more neural networks, on-device grammar checking of a sequence of words in the inputted text, including: determining, using the one or more neural networks, a grammatically correct version of the sequence of words, and determining that the sequence of words does not match the grammatically correct version of the sequence of words; and in response to determining that the sequence of words does not match the grammatically correct version of the sequence of words, output, for display at a display device, at least a portion of the grammatically correct version of the sequence of words as a suggested replacement for at least a portion of the sequence of words in the inputted text.

Example 42: The computer-readable storage medium of example 41, wherein the instructions further cause the one or more processors to: in response to receiving an indication of user input that corresponds to accepting at least the portion of the grammatically correct version of the sequence of words as the replacement for at least the portion of the sequence of words in the inputted text, replace at least the portion of the sequence of words in the inputted text with at least the portion of the grammatically correct version of the sequence of words.

Example 43: The computer-readable storage medium of any of examples 41 and 42, wherein the instructions that cause the one or more processors to determine the grammatically correct version of the sequence of words further cause the one or more processors to: inputting the sequence of words into the one or more neural networks to generate a second sequence of words that corresponds to the sequence of words; and performing post-processing of the second sequence of words to generate the grammatically correct version of the sequence of words.

Example 44: The computer-readable storage medium of example 43, wherein the instructions that cause the one or more processors to perform the post-processing of the second sequence of words to generate the grammatically correct version of the sequence of words further cause the one or more processors to: modify a pronoun in the second sequence of words to match a gender of a pronoun in the sequence of words; and determine the second sequence of words having the modified pronoun as the grammatically correct version of the sequence of words.

Example 45: The computer-readable storage medium of any of examples 43 and 44, wherein the instructions that cause the one or more processors to perform the post-processing of the second sequence of words to generate the grammatically correct version of the sequence of words further cause the one or more processors to: modify a subject in the second sequence of words to match a subject in the sequence of words; and determine the second sequence of words having the modified subject as the grammatically correct version of the sequence of words.

Example 46: The computer-readable storage medium of any of examples 43-45, wherein the instructions that cause the one or more processors to perform the post-processing of the second sequence of words to generate the grammatically correct version of the sequence of words further cause the one or more processors to: insert a first one or more emojis in the second sequence of words to match a second one or more emojis in the sequence of words; and determine the second sequence of words having the first one or more emojis as the grammatically correct version of the sequence of words.

Example 47: The computer-readable storage medium of any of examples 43-46, wherein the instructions further cause the one or more processors to: perform, using the one or more neural networks, on-device grammar checking of a third sequence of words in the inputted text, including: input the third sequence of words into the one or more neural networks to generate a fourth sequence of words that corresponds to the third sequence of words; and determine that the third sequence of words includes a sensitive topic; and in response to determining that the third sequence of words includes the sensitive topic, refrain from outputting a suggested replacement for the third sequence of words in the inputted text.

Example 48: The computer-readable storage medium of any of examples 43-47, wherein the one or more neural networks comprises a sentence model for performing grammar checking of sentences and a prefix model for performing grammar checking of sentence fragments.

Example 49: The computer-readable storage medium of example 48, wherein the instructions further cause the one or more processors to: determine whether to use the sentence model or the prefix model to perform grammar checking of the sequence of words based at least in part on determining whether the sequence of words is a sentence or whether the sequence of words is a sentence fragment.

Example 50: The computer-readable storage medium of any of examples 48 and 49, wherein the instructions further cause the one or more processors to: determine whether to use the sentence model or the prefix model to perform grammar checking of the sequence of words based at least in part on an application that received the inputted text including the sequence of words.

Example 51: The computer-readable storage medium of any of examples 41-50, wherein the one or more neural networks comprise a sequence-to-sequence model containing a long short-term memory (LSTM) encoder and a LSTM decoder with attention.

Example 52: The computer-readable storage medium of any of examples 41-51 wherein the one or more neural networks are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence.

Example 53: The computer-readable storage medium of example 52, wherein the training set is determined using distillation.

Example 54: The computer-readable storage medium of example 53, wherein the training set is determined by using a server-side grammar error correction model as a teacher model over web pages containing user-generated content.

Example 55: The computer-readable storage medium of any of examples 48-54, wherein the prefix model is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

Example 56: The computer-readable storage medium of any of examples 41-55, wherein the instructions further cause the one or more processors to: update the one or more neural networks based at least in part on whether the grammatically correct version of the sequence of words is accepted as the suggested replacement for the sequence of words in the inputted text.

Example 57: The computer-readable storage medium of any of examples 41-56, wherein the instructions further cause the one or more processors to: perform federated training of the one or more neural networks to update the one or more neural networks with data received from one or more computing devices.

Example 58: The computer-readable storage medium of example 57, wherein the instructions further cause the one or more processors to: select the one or more computing device with which the computing device performs federated training of the one or more neural networks based at least in part on locations of the one or more computing devices.

Example 59: The computer-readable storage medium of any of examples 41-58, wherein the instructions that cause the one or more processors to perform, using the one or more neural networks, on-device grammar checking of the sequence of words in the inputted text further cause the one or more processors to: execute a system-wide input method editor (IME) that includes the one or more neural networks.

Example 60: The computer-readable storage medium of any of examples 41-59, wherein: the instructions that cause the one or more processors to determine the grammatically correct version of the sequence of words further cause the one or more processors to determine, using the one or more neural networks, a plurality of grammatically versions of the sequence of words; the instructions that cause the one or more processors to determine that the sequence of words does not match the grammatically correct version of the sequence of words further cause the one or more processors to determine that the sequence of words does not match any one of the plurality of grammatically versions of the sequence of words; and the instructions that cause the one or more processors to output, for display at the display device, at least the portion of the grammatically correct version of the sequence of words as the suggested replacement for at least a portion of the sequence of words in the inputted text further cause the one or more processors to output, in response to determining that the sequence of words does not match any one of the plurality of grammatically versions of the sequence of words, for display at the display device, the plurality of grammatically versions of the sequence of words as the suggested replacement for the sequence of words in the inputted text.

Example 61: A method includes receiving, by a computing device, inputted text; performing, by the computing device using one or more neural networks, on-device grammar checking of a sequence of words in the inputted text, including: determining, by the computing device and using the one or more neural networks, a grammatically correct version of the sequence of words, and determining, by the computing device, that the sequence of words does not match the grammatically correct version of the sequence of words; and in response to determining that the sequence of words does not match the grammatically correct version of the sequence of words, outputting, by the computing device and for display at a display device, at least a portion of the grammatically correct version of the sequence of words as a suggested replacement for at least a portion of the sequence of words in the inputted text.

Example 62: The method of example 61, further includes in response to receiving an indication of user input that corresponds to accepting at least the portion of the grammatically correct version of the sequence of words as the replacement for at least the portion of the sequence of words in the inputted text, replacing, by the computing device, at least the portion of the sequence of words in the inputted text with at least the portion of the grammatically correct version of the sequence of words.

Example 63: The method of any of examples 61 and 62, wherein determining the grammatically correct version of the sequence of words further comprises: inputting, by the computing device, the sequence of words into the one or more neural networks to generate a second sequence of words that corresponds to the sequence of words; and performing, by the computing device, post-processing of the second sequence of words to generate the grammatically correct version of the sequence of words.

Example 64: The method of example 663, wherein performing the post-processing of the second sequence of words to generate the grammatically correct version of the sequence of words further comprises: modifying, by the computing device, a pronoun in the second sequence of words to match a gender of a pronoun in the sequence of words; and determining, by the computing device, the second sequence of words having the modified pronoun as the grammatically correct version of the sequence of words.

Example 65: The method of any of examples 61-64, further includes performing, by the computing device using the one or more neural networks, on-device grammar checking of a third sequence of words in the inputted text, including: inputting, by the computing device, the third sequence of words into the one or more neural networks to generate a fourth sequence of words that corresponds to the third sequence of words; and determining, by the computing device, that the third sequence of words includes a sensitive topic; and in response to determining that the third sequence of words includes the sensitive topic, refraining, by the computing device, from outputting a suggested replacement for the third sequence of words in the inputted text.

Example 66: The method of any of examples 61-65, wherein the one or more neural networks comprises a sentence model for performing grammar checking of sentences and a prefix model for performing grammar checking of sentence fragments.

Example 67: The method of example 66, further includes determining, by the computing device, whether to use the sentence model or the prefix model to perform grammar checking of the sequence of words based at least in part on determining whether the sequence of words is a sentence or whether the sequence of words is a sentence fragment.

Example 68: The method of any of examples 66 and 67, further includes determining, by the computing device, whether to use the sentence model or the prefix model to perform grammar checking of the sequence of words based at least in part on an application that received the inputted text including the sequence of words.

Example 69: The method of any of examples 61-68, wherein the one or more neural networks comprise a sequence-to-sequence model containing a long short-term memory (LSTM) encoder and a LSTM decoder with attention.

Example 70: The method of any of examples 61-69, wherein the one or more neural networks are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence.

Example 71: The method of example 70, wherein the training set is determined by using a server-side grammar error correction model as a teacher model over web pages containing user-generated content.

Example 72: The method of any of examples 66-71, wherein the prefix model is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

Example 73: The method of any of examples 61-72, further includes updating, by the computing device, the one or more neural networks based at least in part on whether the grammatically correct version of the sequence of words is accepted as the suggested replacement for the sequence of words in the inputted text.

Example 74: The method of any of examples 61-73, wherein performing, using the one or more neural networks, on-device grammar checking of the sequence of words in the inputted text further comprises: executing, by the computing device, a system-wide input method editor (IME) that includes the one or more neural networks.

Example 75: The method of any of examples 61-74, wherein: determining the grammatically correct version of the sequence of words comprises determining, by the computing device and using the one or more neural networks, a plurality of grammatically versions of the sequence of words; determining that the sequence of words does not match the grammatically correct version of the sequence of words comprises determining, by the computing device, that the sequence of words does not match any one of the plurality of grammatically versions of the sequence of words; and outputting, by the computing device and for display at the display device, at least the portion of the grammatically correct version of the sequence of words as the suggested replacement for at least a portion of the sequence of words in the inputted text further comprises in response to determining that the sequence of words does not match any one of the plurality of grammatically versions of the sequence of words, outputting, by the computing device and for display at the display device, the plurality of grammatically versions of the sequence of words as the suggested replacement for the sequence of words in the inputted text.

Example 76: A computing device comprising means for performing any of the methods of examples 61-75.

Example 77: A computer-readable storage medium storing instructions that, when executed, cause one or more processors of a computing device to perform any of the methods of examples 61-75.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
  receiving, at an input device of a mobile computing device, inputted text;
  performing, by the mobile computing device using one or more neural networks installed on the mobile computing device and configured to perform grammar checking without communicating with an external device, on-device grammar checking of a sequence of words in the inputted text, including:
    determining, by processing the sequence of words at the mobile computing device and using the one or more neural networks, a grammatically correct version of the sequence of words, wherein the one or more neural networks are trained to receive a sequence of words as input and to output a grammatically correct version of the sequence of words received as input, and determining, by the mobile computing device, that the sequence of words does not match the grammatically correct version of the sequence of words; and in response to determining that the sequence of words does not match the grammatically correct version of the sequence of words, outputting, by the mobile computing device and for display at a display device, at least a portion of the grammatically correct version of the sequence of words as a suggested replacement for at least a portion of the sequence of words in the inputted text.

2. The method of claim 1, further comprising:

in response to receiving an indication of user input that corresponds to accepting at least the portion of the grammatically correct version of the sequence of words as the replacement for at least the portion of the sequence of words in the inputted text, replacing, by the mobile computing device, at least the portion of the sequence of words in the inputted text with at least the portion of the grammatically correct version of the sequence of words.

3. The method of claim 1, wherein determining the grammatically correct version of the sequence of words further comprises:

inputting, by the mobile computing device, the sequence of words into the one or more neural networks to generate a second sequence of words that corresponds to the sequence of words; and performing, by the mobile computing device, post-processing of the second sequence of words to generate the grammatically correct version of the sequence of words.

4. The method of claim 3, wherein performing the post-processing of the second sequence of words to generate the grammatically correct version of the sequence of words further comprises:

modifying, by the mobile computing device, a pronoun in the second sequence of words to match a gender of a pronoun in the sequence of words; and determining, by the mobile computing device, the second sequence of words having the modified pronoun as the grammatically correct version of the sequence of words.

5. The method of claim 1, further comprising:

performing, by the mobile computing device using the one or more neural networks, on-device grammar checking of a third sequence of words in the inputted text, including:

inputting, by the mobile computing device, the third sequence of words into the one or more neural networks to generate a fourth sequence of words that corresponds to the third sequence of words; and determining, by the mobile computing device, that the third sequence of words includes a sensitive topic; and in response to determining that the third sequence of words includes the sensitive topic, refraining, by the mobile computing device, from outputting a suggested replacement for the third sequence of words in the inputted text.

6. The method of claim 1, wherein the one or more neural networks comprises a sentence model for performing grammar checking of sentences and a prefix model for performing grammar checking of sentence fragments.

7. The method of claim 6, further comprising:

determining, by the mobile computing device, whether to use the sentence model or the prefix model to perform grammar checking of the sequence of words based at least in part on determining whether the sequence of words is a sentence or whether the sequence of words is a sentence fragment.

8. The method of claim 6, further comprising:

determining, by the mobile computing device, whether to use the sentence model or the prefix model to perform grammar checking of the sequence of words based at least in part on an application that received the inputted text including the sequence of words.

9. The method of claim 1, wherein the one or more neural networks comprise a sequence-to-sequence model containing a long short-term memory (LSTM) encoder and a LSTM decoder with attention.

10. The method of claim 1, wherein the one or more neural networks are trained using a training set that includes a plurality of corrected examples and a plurality of no-op examples, wherein each of the plurality of corrected examples includes a first input sentence and a first grammatically correct version of the first input sentence that does not match the first input sentence, and wherein each of the plurality of no-op examples includes a second input sentence and a second grammatically correct version of the second input sentence that matches the second input sentence.

11. The method of claim 10, wherein the training set is determined by using a server-side grammar error correction model as a teacher model over web pages containing user-generated content.

12. The method of claim 6, wherein the prefix model is trained using a plurality of sentence prefix pairs, wherein each sentence prefix pair in the sentence prefix pairs includes a first sentence prefix of a first sentence that is not grammatically correct and a second sentence prefix of a second sentence that is a grammatically correct version of the first sentence.

13. The method of claim 1, further comprising:

updating, by the mobile computing device, the one or more neural networks based at least in part on whether the grammatically correct version of the sequence of words is accepted as the suggested replacement for the sequence of words in the inputted text.

14. The method of claim 1, wherein performing, using the one or more neural networks, on-device grammar checking of the sequence of words in the inputted text further comprises:

executing, by the mobile computing device, a system-wide input method editor (IME) that includes the one or more neural networks.

15. The method of claim 1, wherein:

determining the grammatically correct version of the sequence of words comprises determining, by the mobile computing device and using the one or more neural networks, a plurality of grammatically versions of the sequence of words;

determining that the sequence of words does not match the grammatically correct version of the sequence of words comprises determining, by the mobile computing device, that the sequence of words does not match any one of the plurality of grammatically versions of the sequence of words; and outputting, by the mobile computing device and for display at the display device, at least the portion of the grammatically correct version of the sequence of words as the suggested replacement for at least a portion of the sequence of words in the inputted text further comprises in response to determining that the sequence of words does not match any one of the plurality of grammatically versions of the sequence of words, outputting, by the mobile computing device and for display at the display device, the plurality of grammatically versions of the sequence of words as the suggested replacement for the sequence of words in the inputted text.

16. A mobile computing device comprising:
a memory that stores instructions and one or more neural networks;
an input device that receives inputted text; and
one or more processors that execute the instructions to:
  perform, using the one or more neural networks installed on the mobile computing device and configured to perform grammar checking without communicating with an external device, on-device grammar checking of a sequence of words in the inputted text, including:
    determine, by processing the sequence of words and using the one or more neural networks, a grammatically correct version of the sequence of words, wherein the one or more neural networks are trained to receive a sequence of words as input and to output a grammatically correct version of the sequence of words received as input, and
    determine that the sequence of words does not match the grammatically correct version of the sequence of words; and
  in response to determining that the sequence of words does not match the grammatically correct version of the sequence of words, output, for display at a display device, at least a portion of the grammatically correct version of the sequence of words as a suggested replacement for at least a portion of the sequence of words in the inputted text.

17. The mobile computing device of claim 16, wherein the one or more processors further execute the instructions to:
  in response to receiving an indication of user input that corresponds to accepting at least the portion of the grammatically correct version of the sequence of words as the replacement for at least the portion of the sequence of words in the inputted text, replace at least the portion of the sequence of words in the inputted text with at least the portion of the grammatically correct version of the sequence of words.

18. The mobile computing device of claim 16, wherein to determine the grammatically correct version of the sequence of words further execute the instructions to:
  input the sequence of words into the one or more neural networks to generate a second sequence of words that corresponds to the sequence of words; and
  perform post-processing of the second sequence of words to generate the grammatically correct version of the sequence of words.

19. The mobile computing device of claim 18, wherein to perform the post-processing of the second sequence of words to generate the grammatically correct version of the sequence of words, the one or more processors further execute the instructions to:
  modify a pronoun in the second sequence of words to match a gender of a pronoun in the sequence of words; and
  determine the second sequence of words having the modified pronoun as the grammatically correct version of the sequence of words.

20. A non-transitory computer-readable storage medium storing instructions that, when executed, cause one or more processors of a mobile computing device to:
  receive, by an input device, inputted text;
  perform, using one or more neural networks installed on the mobile computing device and configured to perform grammar checking without communicating with an external device, on-device grammar checking of a sequence of words in the inputted text, including:
    determine, by processing the sequence of words and using the one or more neural networks, a grammatically correct version of the sequence of words, wherein the one or more neural networks are trained to receive a sequence of words as input and to output a grammatically correct version of the sequence of words received as input, and
    determine that the sequence of words does not match the grammatically correct version of the sequence of words; and
  in response to determining that the sequence of words does not match the grammatically correct version of the sequence of words, output, for display at a display device, at least a portion of the grammatically correct version of the sequence of words as a suggested replacement for at least a portion of the sequence of words in the inputted text.

* * * * *